(12) United States Patent
Ciurea

(10) Patent No.: US 10,607,219 B2
(45) Date of Patent: Mar. 31, 2020

(54) SYSTEMS AND METHODS TO PROVIDE PRIVACY PROTECTION FOR ACTIVITIES RELATED TO TRANSACTIONS

(71) Applicant: Visa International Service Association, San Francisco, CA (US)

(72) Inventor: Peter Ciurea, Orinda, CA (US)

(73) Assignee: Visa International Service Association, San Francisco, CA (US)

( * ) Notice: Subject to any disclaimer, the term of this patent is extended or adjusted under 35 U.S.C. 154(b) by 721 days.

(21) Appl. No.: 13/914,121

(22) Filed: Jun. 10, 2013

(65) Prior Publication Data
US 2013/0332361 A1 Dec. 12, 2013

Related U.S. Application Data

(60) Provisional application No. 61/658,055, filed on Jun. 11, 2012.

(51) Int. Cl.
*G06Q 20/40* (2012.01)

(52) U.S. Cl.
CPC .......... *G06Q 20/40* (2013.01); *G06Q 20/405* (2013.01)

(58) Field of Classification Search
CPC ......... G06F 21/6245; G06F 2221/2141; G06F 21/00; H04L 63/04; H04L 63/105; H04W 8/20; G06Q 30/00; G06Q 20/385; G06Q 30/02; G06Q 50/188; G06Q 10/06316
USPC .......................................................... 705/38
See application file for complete search history.

(56) References Cited

U.S. PATENT DOCUMENTS

| | | | | |
|---|---|---|---|---|
| 6,490,601 | B1 * | 12/2002 | Markus | G06F 17/243 705/80 |
| 6,578,006 | B1 * | 6/2003 | Saito | G06Q 10/04 705/7.26 |
| 6,928,544 | B2 | 8/2005 | Chu | |
| 7,930,252 | B2 | 4/2011 | Bender et al. | |
| 8,447,695 | B2 | 5/2013 | Chenthamarakshan | |
| 8,655,719 | B1 * | 2/2014 | Li | G06O 30/06 705/14.1 |
| 8,843,997 | B1 * | 9/2014 | Hare | H04L 63/0281 709/200 |
| 9,805,213 | B1 * | 10/2017 | Kragh | G06F 21/6227 |
| 2001/0025271 | A1 * | 9/2001 | Allen | G06F 21/6245 705/65 |
| 2001/0049620 | A1 | 12/2001 | Blasko | |
| 2002/0099824 | A1 | 7/2002 | Bender et al. | |
| 2002/0147653 | A1 | 10/2002 | Shmueli et al. | |

(Continued)

OTHER PUBLICATIONS

Business and Professions code—BPC 18400-22948.25—California Law, 2003; 1 page.*

(Continued)

*Primary Examiner* — Samica L Norman
*Assistant Examiner* — Mary M Gregg
(74) *Attorney, Agent, or Firm* — The Webb Law Firm

(57) ABSTRACT

A computing apparatus includes: a portal configured to present a privacy control panel to receive input from a user to create a privacy policy; a data warehouse configured to store the privacy policy in connection with account information of the user; and a transaction handler configured to provide a privacy indicator, in accordance with the privacy policy stored in the data warehouse, in an authorization response for a transaction made using the account information of the user.

16 Claims, 13 Drawing Sheets

(56) References Cited

U.S. PATENT DOCUMENTS

| | | |
|---|---|---|
| 2002/0188572 A1 | 12/2002 | Bleizeffer et al. |
| 2002/0188863 A1 | 12/2002 | Friedman |
| 2003/0105723 A1 | 6/2003 | Skea |
| 2004/0054918 A1 | 3/2004 | Duri et al. |
| 2004/0117220 A1 | 6/2004 | Chess et al. |
| 2005/0273842 A1 | 12/2005 | Wright et al. |
| 2006/0004703 A1* | 1/2006 | Spivack ............... G06F 17/3089 |
| 2006/0015463 A1* | 1/2006 | Gupta ................. G06Q 20/085 705/52 |
| 2006/0143688 A1 | 6/2006 | Futoransky et al. |
| 2007/0143853 A1 | 6/2007 | Tsukamoto |
| 2007/0156585 A1 | 7/2007 | Chenthamarakshan |
| 2007/0198432 A1 | 8/2007 | Pitroda et al. |
| 2008/0229384 A1* | 9/2008 | Hodgkinson ........... G06F 21/41 726/1 |
| 2009/0006851 A1* | 1/2009 | Freeman ............. H04L 63/0442 713/170 |
| 2009/0063354 A1 | 3/2009 | Sheets et al. |
| 2009/0138547 A1 | 5/2009 | Boudreau |
| 2009/0150297 A1 | 6/2009 | Richard |
| 2009/0254463 A1* | 10/2009 | Tomchek ............... G06Q 20/12 705/30 |
| 2009/0276825 A1 | 11/2009 | Hatakeyama et al. |
| 2010/0146301 A1 | 6/2010 | Yu et al. |
| 2010/0276484 A1 | 11/2010 | Banerjee et al. |
| 2010/0312626 A1 | 12/2010 | Cervenka |
| 2010/0312631 A1 | 12/2010 | Cervenka |
| 2010/0312635 A1 | 12/2010 | Cervenka |
| 2011/0055019 A1 | 3/2011 | Coleman |
| 2011/0079648 A1 | 4/2011 | Pourfallah |
| 2011/0087550 A1 | 4/2011 | Fordyce, III et al. |
| 2011/0264501 A1 | 10/2011 | Clyne |
| 2012/0072997 A1* | 3/2012 | Carlson ............... G06Q 30/0254 726/28 |
| 2012/0271691 A1* | 10/2012 | Hammad ............... G06Q 30/02 705/14.17 |
| 2012/0317624 A1* | 12/2012 | Monjas Llorente .. H04L 63/105 726/4 |
| 2013/0006748 A1* | 1/2013 | Horvitz ................. G06Q 30/02 705/14.39 |
| 2013/0007041 A1* | 1/2013 | Comparelli ............ G06Q 30/02 707/769 |
| 2013/0080785 A1* | 3/2013 | Ruhlen .................. H04L 67/16 713/176 |
| 2013/0151413 A1* | 6/2013 | Sears ................... G06Q 20/405 705/44 |
| 2013/0218670 A1 | 8/2013 | Spears et al. |
| 2013/0226609 A1 | 8/2013 | Pourfallah et al. |
| 2013/0231974 A1 | 9/2013 | Harris et al. |
| 2013/0246150 A1 | 9/2013 | Ovick et al. |
| 2013/0325579 A1 | 12/2013 | Salmon et al. |
| 2013/0332362 A1 | 12/2013 | Ciurea |
| 2014/0040134 A1 | 2/2014 | Ciurea |
| 2014/0129942 A1* | 5/2014 | Rathod ............ H04N 21/44222 715/720 |
| 2016/0358197 A1 | 12/2016 | Ovick et al. |

OTHER PUBLICATIONS

Dictionary of computers, Inromation Processing and communications; 2nd Ed. 1990.*

Privacy Problems with Anonymized Transaction Databases by Taneli Mielikainen; Conference Paper (PDF Available) • Oct. 2004 (Year: 2004).*

Title: Systems and Methods to Customize Privacy Preferences, U.S. Appl. No. 13/914,293, filed Jun. 10, 2013, Peter Ciurea Status: Docketed New Case—Ready for Examination Status Date: Aug. 29, 2013.

Title: Systems and Methods to Protect User Privacy, U.S. Appl. No. 13/957,166, filed Aug. 1, 2013, Peter Ciurea Status: Docketed New Case—Ready for Examination Status Date: Sep. 15, 2013.

Alessandro Acquisti, Privacy and Security of Personal Information, Economic Incentives and Technological Solutions, acquisti@andrew. cmu.edu, 2004 (9pgs).

Alessandro Acquisti, Privacy & Securityy of Personal Information. Economic Incentives and Technological Solutions. Chapter 1. 2004. 9 pages.

* cited by examiner

SYSTEMS AND METHODS TO PROVIDE PRIVACY PROTECTION FOR ACTIVITIES RELATED TO TRANSACTIONS

CROSS REFERENCE TO RELATED APPLICATION

The present application claims priority to Prov. U.S. Pat. App. Ser. No. 61/658,055, filed Jun. 11, 2012 and entitled "Systems and Methods to Provide Privacy Protection for Activities Related to Transactions," the entire disclosure of which application is hereby incorporated herein by reference.

The present application relates to U.S. patent application Ser. No. 13/914,293, filed Jun. 10, 2013 and entitled "Systems and Methods to Customize Privacy Preferences", the disclosure of which is hereby incorporated herein by reference.

FIELD OF THE TECHNOLOGY

At least some embodiments of the present disclosure relate to data or information management in general and more particularly, but not limited to, data related to payment transactions made via credit cards, debit cards, prepaid cards, etc.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as a cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
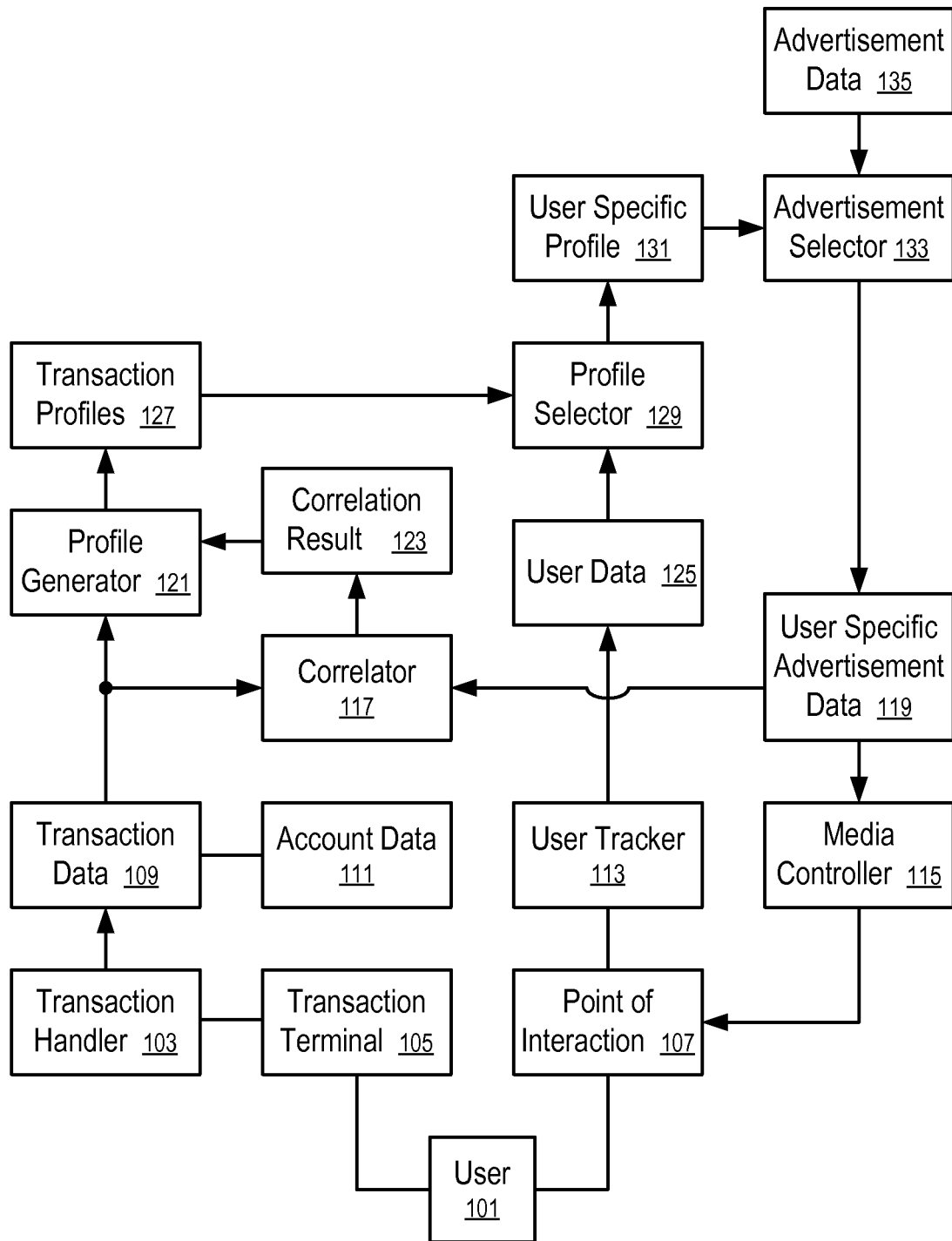
FIG. 1 illustrates a system to provide services based on transaction data according to one embodiment.

In one embodiment, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc. In one embodiment, users are required to enroll in a service program and provide consent to allow the system to use related transaction data and/or other data for the related services. The system is configured to provide the services while protecting the privacy of the users in accordance with the enrollment agreement and user consent.

Transaction data can be used for various purposes, such as marketing, reporting, benchmarking, researching, etc. In some applications, transaction data may be combined with data from other data sources, such as commercial databases. In some applications, transaction data or information derived from transaction data (with or without the use of external data sources) may be provided to third parties, such as search engines, marketers, media channels, researchers, media response measurers, etc.

In one embodiment, a transaction handler (e.g., a processor of credit cards, debit cards, prepaid cards) is configured to use an input engine and a broker engine to combine, unify, and secure access to the transaction data recorded at the transaction handler, information generated from the transaction data, and external data from third party data sources. Further details and examples about the data engines configured to integrate data for unified access in one embodiment are provided in the section entitled "DATA INTEGRATION ENGINE."

In one embodiment, the data warehouse of the transaction handler is configured to not only record the transactions but also store data related to the transactions to facilitate various services that use the data. In one embodiment, the data stored the warehouse are configured with personalized tags identifying the limits on permissible usage the data. Further details and examples about configuring the data according to one embodiment are provided in the section entitled "DATA SERVICES."

In one embodiment, a data warehouse is configured to store the personal privacy policy of a user to represent the privacy preferences of the user. After an authorization request for a transaction between the user and a merchant is received and/or processed, privacy preferences of the user that are applicable to the data recorded by the merchant in connection with the transaction are determined from the personal privacy policy and transmitted to a computing device of the merchant. The data recorded by the merchant about the user in connection with the transaction is managed according to the privacy preferences. Further details and examples about the privacy protection according to one embodiment are provided in the section entitled "PRIVACY."

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers. In one embodiment, the transaction handler is further automated to process the advertisement fees charged to the advertisers, using the accounts of the advertisers, in response to the advertising activities.

In one embodiment, the computing apparatus correlates transactions with activities that occurred outside the context of the transaction, such as online advertisements presented to the customers that at least in part cause offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.

System

FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

Figure 2:
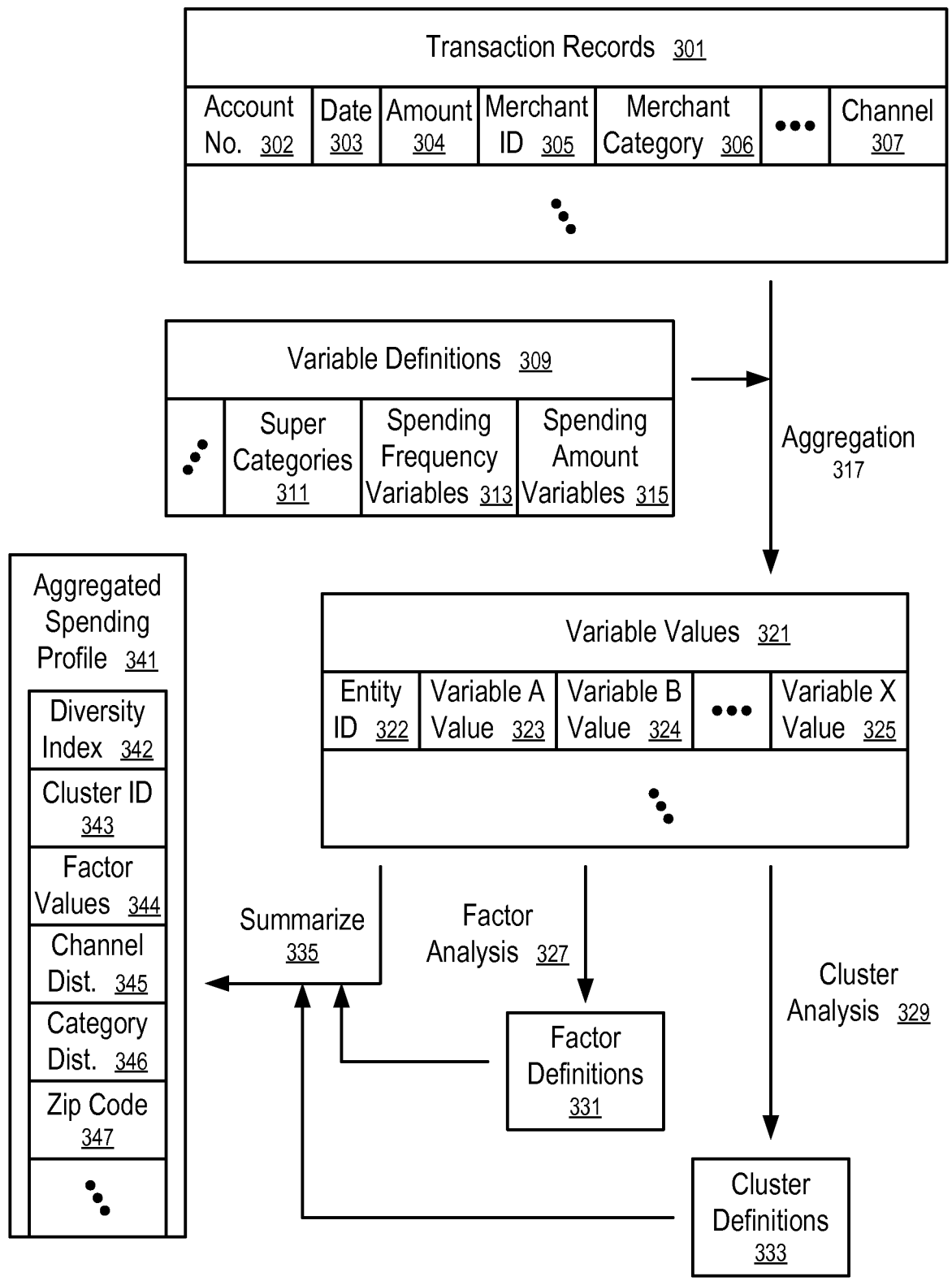
FIG. 2 illustrates the generation of an aggregated spending profile according to one embodiment.
Figure 3:
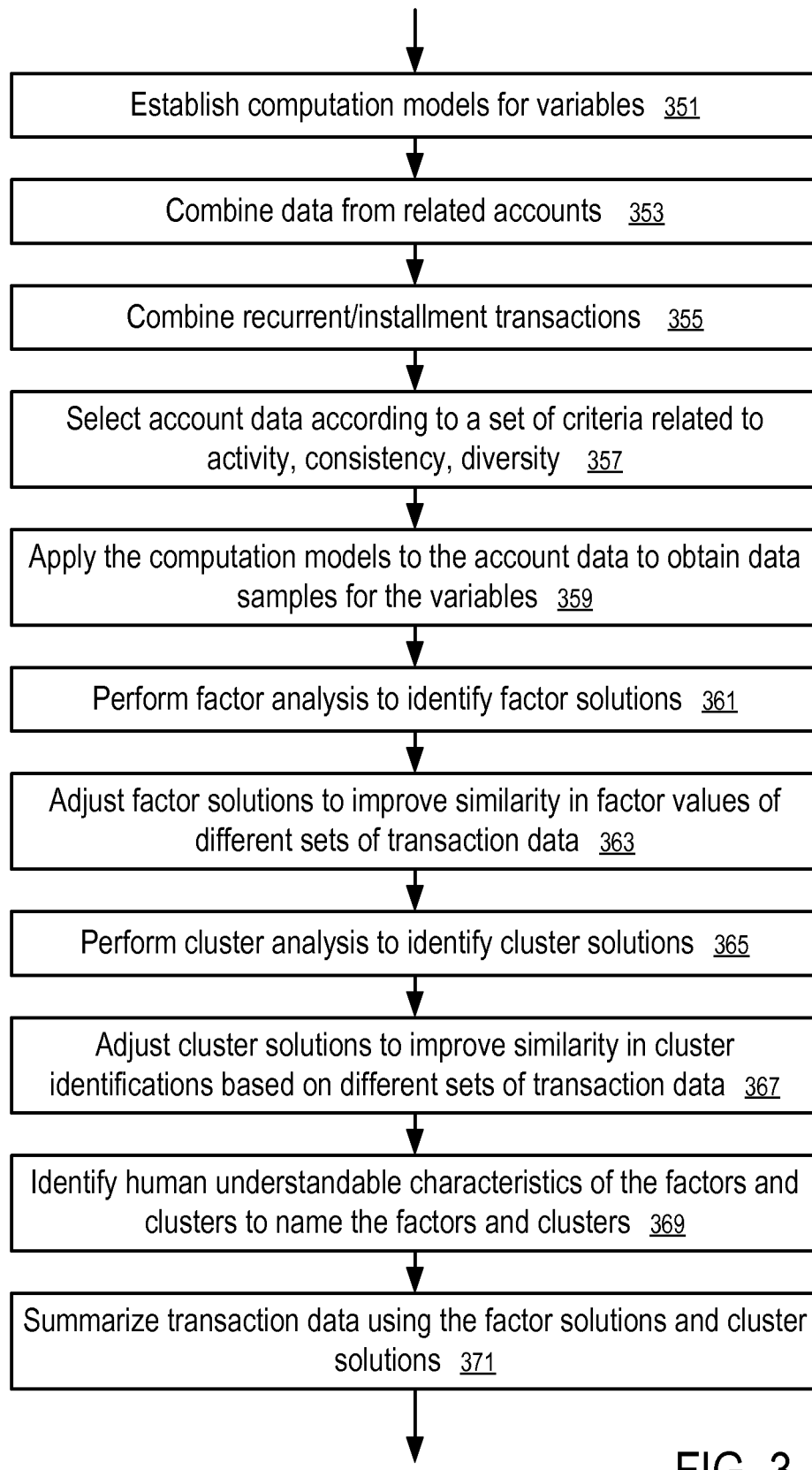
FIG. 3 shows a method to generate an aggregated spending profile according to one embodiment.

In one embodiment, the transaction profiles (127) are generated from the transaction data (109) in a way as illustrated in FIGS. 2 and 3. For example, in FIG. 3, an aggregated spending profile (341) is generated via the factor analysis (327) and cluster analysis (329) to summarize (335) the spending patterns/behaviors reflected in the transaction records (301).

Figure 4:
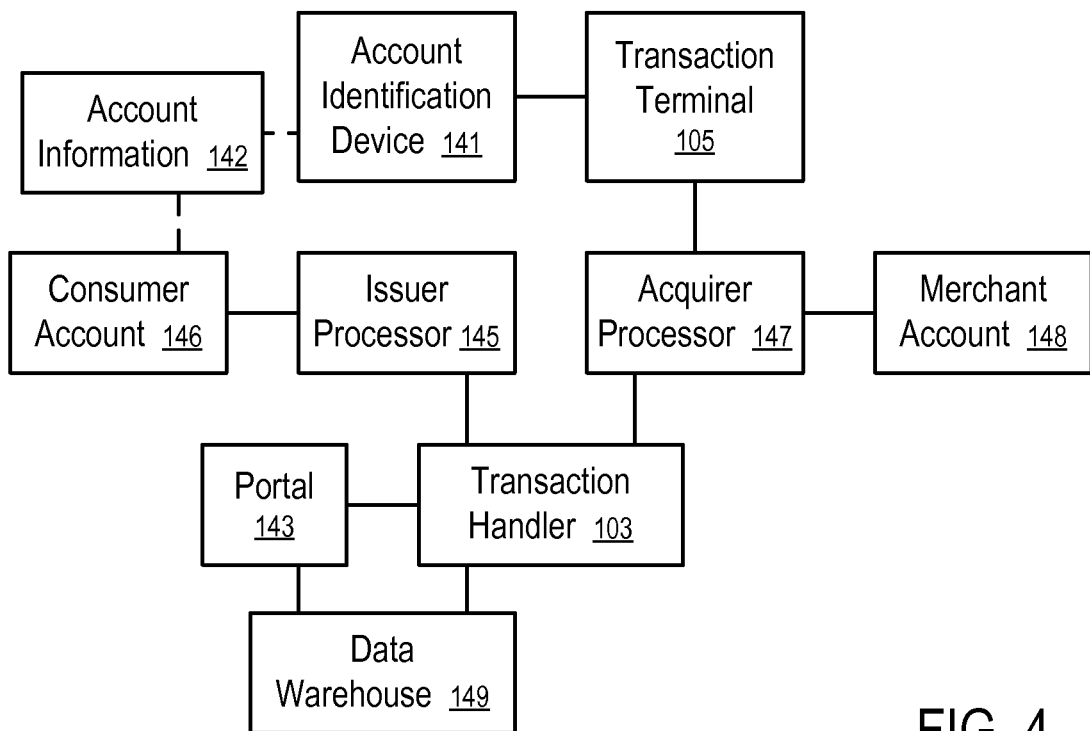
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
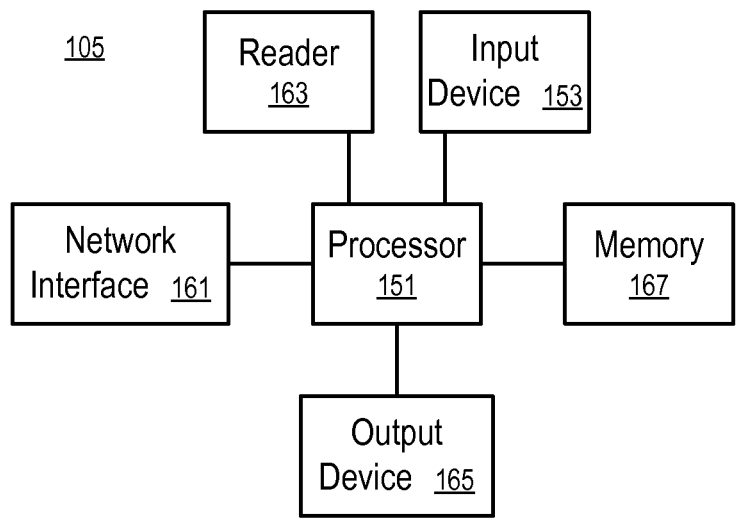
FIG. 5 illustrates a transaction terminal according to one embodiment.
Figure 6:
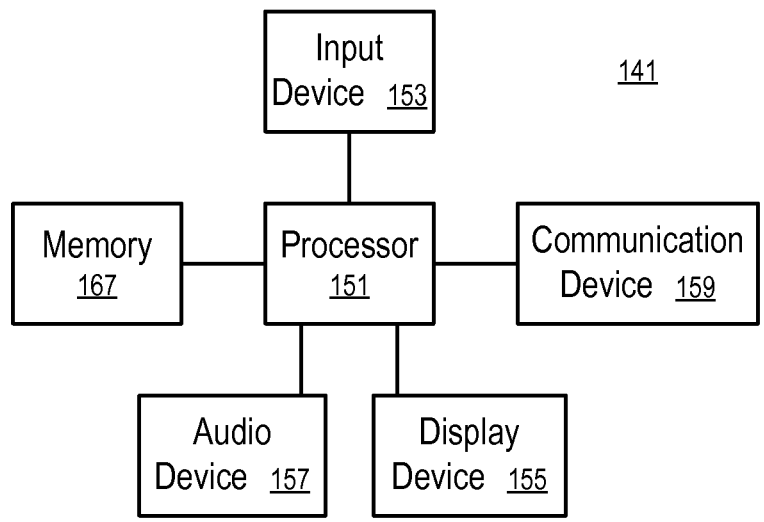
FIG. 6 illustrates an account identifying device according to one embodiment.
Figure 7:
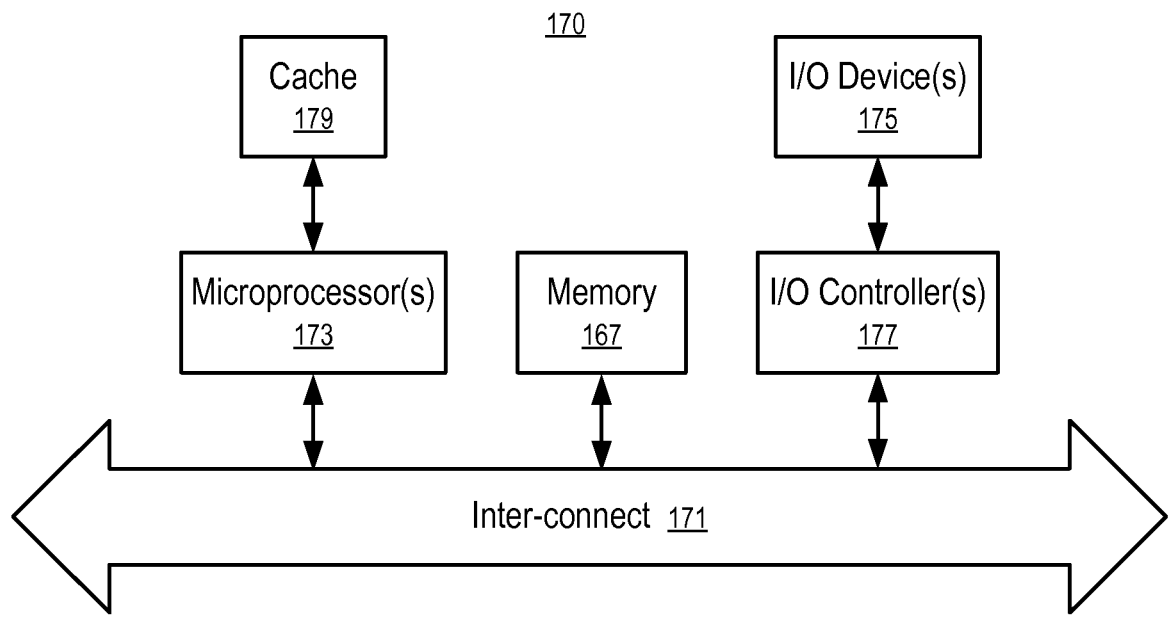
FIG. 7 illustrates a data processing system according to one embodiment.

FIGS. 5 and 6 illustrate examples of transaction terminals (105) and account identification devices (141). FIG. 7 illustrates the structure of a data processing system that can be used to implement, with more or fewer elements, at least some of the components in the system, such as the point of interaction (107), the transaction handler (103), the portal (143), the data warehouse (149), the account identification device (141), the transaction terminal (105), the user tracker (113), the profile generator (121), the profile selector (129), the advertisement selector (133), the media controller (115), etc. Some embodiments use more or fewer components than those illustrated in FIGS. 1 and 4-7, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spending band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, and other examples discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of an advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real-time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relationships to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real-time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction will occur. For example, the analysis of the transaction data (109) can be used to predict when a next transaction having the periodic feature will occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in U.S. patent application Ser. No. 12/773,770, filed May 4, 2010 and entitled "Frequency-Based Transaction Prediction and Processing," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned Pub. No. 2008/0319843, and entitled "Supply of Requested Offer Based on Point-of Service to Offeree Distance," U.S. patent application Ser. No. 11/755,575, filed May 30, 2007, assigned Pub. No. 2008/0300973, and entitled "Supply of Requested Offer Based on Offeree Transaction History," U.S. patent application Ser. No. 11/855,042, filed Sep. 13, 2007, assigned Pub. No. 2009/0076896, and entitled "Merchant Supplied Offer to a Consumer within a Predetermined Distance," U.S. patent application Ser. No. 11/855,069, filed Sep. 13, 2007, assigned Pub. No. 2009/0076925, and entitled "Offeree Requested Offer Based on Point-of Service to Offeree Distance," and U.S. patent application Ser. No. 12/428,302, filed Apr. 22, 2009 and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregated spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist in the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in U.S. patent application Ser. No. 11/960,162, filed Dec. 19, 2007, assigned Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in U.S. patent application Ser. No. 11/862,487, filed Sep. 27, 2007 and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185,332, filed Aug. 4, 2008, assigned Pub. No. 2010/0030644, and entitled "Targeted Advertising by Payment Processor History of Cashless Acquired Merchant Transaction on Issued Consumer Account," and in U.S. patent application Ser. No. 12/849,793, filed Aug. 3, 2010 and entitled "Systems and Methods for Targeted Advertisement Delivery, the disclosures of which applications are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) for a particular user or group of users that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real-time; and the profile selector (129) uses the user data (125) to query the profile generator (121) to generate the user specific profile (131) in real-time, or just in time. The profile generator (121) generates the user specific profile (131) that best matches the user data (125).

In one embodiment, the user tracker (113) identifies the user (101) based on the user's activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341), to present effective, timely, and relevant marketing information to the user (101) via the preferred communication channel (e.g., mobile communications, web, mail, email, point-of-sale (POS) terminal, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, in one embodiment, a first user tracker (113) observes the card number of the user (101) at a particular IP address for a time period identified by a timestamp (e.g., via an online payment process); and a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

In one embodiment, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, in one embodiment, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in the query received in the portal (143) matches the IP address previously recorded by the transaction handler (103), the portal (143) determines that the user (101) identified by the IP address in the request is the same user (101) associated with the account used in the transaction initiated at the IP address. In one embodiment, a match is found when the time of the query request is within a predetermined time period from the transaction request, such as a few minutes, one hour, a day, etc. In one embodiment, the query may also include a cookie ID representing the user (101). Thus, through matching the IP address, the cookie ID is associated with the account information (142) in a persistent way.

In one embodiment, the portal (143) obtains the IP address of the online transaction directly. For example, in one embodiment, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

In one embodiment, the web browser of the user (101) communicates the user-provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

In one embodiment, the portal (143) is configured to identify the consumer account (146) based on the IP address identified in the user data (125) through mapping the IP address to a street address. For example, in one embodiment, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in U.S. patent application Ser. No. 12/849,798, filed Aug. 3, 2010 and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

In one embodiment, the correlator (117) is to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a website, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, appearance, or other characteristic of the advertisement results in actual increased sales. Adjustments to advertisements (e.g., placement, appearance, etc.) may be made to facilitate maximum sales.

In one embodiment, the correlator (117) matches the online activities and the transactions based on matching the user data (125) provided by the user tracker (113) and the records of the transactions, such as transaction data (109) or transaction records (301). In another embodiment, the correlator (117) matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in U.S. patent application Ser. No. 12/849,789, filed Aug. 3, 2010 and entitled "Systems and Methods to Deliver Targeted Advertisements to Audience," the disclosure of which application is incorporated herein by reference.

Matching Advertisement & Transaction

In one embodiment, the correlator (117) is configured to receive information about the user specific advertisement data (119), monitor the transaction data (109), identify transactions that can be considered results of the advertisement corresponding to the user specific advertisement data (119), and generate the correlation result (123), as illustrated in FIG. 1.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, whereas the advertisement is presented outside the retail store). In one embodiment, the correlator (117) uses a set of correlation criteria to identify the transactions that can be considered as the results of the advertisements.

In one embodiment, the correlator (117) identifies the transactions linked or correlated to the user specific advertisement data (119) based on various criteria. For example, the user specific advertisement data (119) may include a coupon offering a benefit contingent upon a purchase made according to the user specific advertisement data (119). The use of the coupon identifies the user specific advertisement data (119), and thus allows the correlator (117) to correlate the transaction with the user specific advertisement data (119).

In one embodiment, the user specific advertisement data (119) is associated with the identity or characteristics of the user (101), such as global unique identifier (GUID), personal account number (PAN), alias, IP address, name or user name, geographical location or neighborhood, household, user group, and/or user data (125). The correlator (117) can link or match the transactions with the advertisements based on the identity or characteristics of the user (101) associated with the user specific advertisement data (119). For example, the portal (143) may receive a query identifying the user data (125) that tracks the user (101) and/or characteristics of the user specific advertisement data (119); and the correlator (117) identifies one or more transactions matching the user data (125) and/or the characteristics of the user specific advertisement data (119) to generate the correlation result (123).

In one embodiment, the correlator (117) identifies the characteristics of the transactions and uses the characteristics to search for advertisements that match the transactions. Such characteristics may include GUID, PAN, IP address, card number, browser cookie information, coupon, alias, etc.

In FIG. 1, the profile generator (121) uses the correlation result (123) to enhance the transaction profiles (127) generated from the profile generator (121). The correlation result (123) provides details on purchases and/or indicates the effectiveness of the user specific advertisement data (119).

In one embodiment, the correlation result (123) is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Coupon Matching

In one embodiment, the correlator (117) identifies a transaction that is a result of an advertisement (e.g., 119) when an offer or benefit provided in the advertisement is redeemed via the transaction handler (103) in connection with a purchase identified in the advertisement.

For example, in one embodiment, when the offer is extended to the user (101), information about the offer can be stored in association with the account of the user (101) (e.g., as part of the account data (111)). The user (101) may visit the portal (143) of the transaction handler (103) to view the stored offer.

The offer stored in the account of the user (101) may be redeemed via the transaction handler (103) in various ways. For example, in one embodiment, the correlator (117) may download the offer to the transaction terminal (105) via the transaction handler (103) when the characteristics of the transaction at the transaction terminal (105) match the characteristics of the offer.

After the offer is downloaded to the transaction terminal (105), the transaction terminal (105) automatically applies the offer when the condition of the offer is satisfied in one embodiment. Alternatively, the transaction terminal (105) allows the user (101) to selectively apply the offers downloaded by the correlator (117) or the transaction handler (103). In one embodiment, the correlator (117) sends reminders to the user (101) at a separate point of interaction (107) (e.g., a mobile phone) to remind the user (101) to redeem the offer. In one embodiment, the transaction handler (103) applies the offer (e.g., via statement credit), without having to download the offer (e.g., coupon) to the transaction terminal (105). Examples and details of redeeming offers via statement credit are provided in U.S. patent application Ser. No. 12/566,350, filed Sep. 24, 2009 and entitled "Real-Time Statement Credits and Notifications," the disclosure of which is hereby incorporated herein by reference.

In one embodiment, the offer is captured as an image and stored in association with the account of the user (101). Alternatively, the offer is captured in a text format (e.g., a code and a set of criteria), without replicating the original image of the coupon.

In one embodiment, when the coupon is redeemed, the advertisement presenting the coupon is correlated with a transaction in which the coupon is redeemed, and/or is determined to have resulted in a transaction. In one embodiment, the correlator (117) identifies advertisements that have resulted in purchases, without having to identify the specific transactions that correspond to the advertisements.

Details about offer redemption via the transaction handler (103) in one embodiment are provided in U.S. patent application Ser. No. 12/849,801, filed Aug. 3, 2010 and entitled "Systems and Methods for Multi-Channel Offer Redemption," the disclosure of which is hereby incorporated herein by reference.

On ATM & POS Terminal

In one example, the transaction terminal (105) is an automatic teller machine (ATM), which is also the point of interaction (107). When the user (101) approaches the ATM to make a transaction (e.g., to withdraw cash via a credit card or debit card), the ATM transmits account information (142) to the transaction handler (103). The account information (142) can also be considered as the user data (125) to select the user specific profile (131). The user specific profile (131) can be sent to an advertisement network to query for a targeted advertisement. After the advertisement network matches the user specific profile (131) with user specific advertisement data (119) (e.g., a targeted advertisement), the transaction handler (103) may send the advertisement to the ATM, together with the authorization for cash withdrawal.

In one embodiment, the advertisement shown on the ATM includes a coupon that offers a benefit that is contingent upon the user (101) making a purchase according to the advertisement. The user (101) may view the offer presented on a space on the ATM screen and select to load or store the coupon in a storage device of the transaction handler (103) under the account of the user (101). The transaction handler (103) communicates with the bank to process the cash withdrawal. After the cash withdrawal, the ATM prints the receipt, which includes a confirmation of the coupon, or a copy of the coupon. The user (101) may then use the coupon printed on the receipt. Alternatively, when the user (101) uses the same account to make a relevant purchase, the transaction handler (103) may automatically apply the coupon stored under the account of the user (101), automatically download the coupon to the relevant transaction terminal (105), or transmit the coupon to the mobile phone of the user (101) to allow the user (101) to use the coupon via a display of the coupon on the mobile phone. The user (101) may visit a web portal (143) of the transaction handler (103) to view the status of the coupons collected in the account of the user (101).

In one embodiment, the advertisement is forwarded to the ATM via the data stream for authorization. In another embodiment, the ATM makes a separate request to a server of the transaction handler (103) (e.g., a web portal) to obtain the advertisement. Alternatively, or in combination, the advertisement (including the coupon) is provided to the user (101) at separate, different points of interactions, such as via a text message to a mobile phone of the user (101), via an email, via a bank statement, etc.

Details of presenting targeted advertisements on ATMs based on purchasing preferences and location data in one embodiment are provided in U.S. patent application Ser. No. 12/266,352, filed Nov. 6, 2008 and entitled "System Including Automated Teller Machine with Data Bearing Medium," the disclosure of which is hereby incorporated herein by reference.

In another example, the transaction terminal (105) is a POS terminal at the checkout station in a retail store (e.g., a self-service checkout register). When the user (101) pays for a purchase via a payment card (e.g., a credit card or a debit card), the transaction handler (103) provides a targeted advertisement having a coupon obtained from an advertisement network. The user (101) may load the coupon into the account of the payment card and/or obtain a hardcopy of the coupon from the receipt. When the coupon is used in a transaction, the advertisement is linked to the transaction.

Details of presenting targeted advertisements during the process of authorizing a financial payment card transaction in one embodiment are provided in U.S. patent application Ser. No. 11/799,549, filed May 1, 2007, assigned Pub. No. 2008/0275771, and entitled "Merchant Transaction Based Advertising," the disclosure of which is hereby incorporated herein by reference.

In one embodiment, the user specific advertisement data (119), such as offers or coupons, is provided to the user (101) via the transaction terminal (105) in connection with an authorization message during the authorization of a transaction processed by the transaction handler (103). The authorization message can be used to communicate the rewards qualified for by the user (101) in response to the current transaction, the status and/or balance of rewards in a loyalty program, etc. Examples and details related to the authorization process in one embodiment are provided in U.S. patent application Ser. No. 11/266,766, filed Nov. 2, 2005, assigned Pub. No. 2007/0100691, and entitled "Method and System for Conducting Promotional Programs," the disclosure of which is hereby incorporated herein by reference.

In one embodiment, when the user (101) is conducting a transaction with a first merchant via the transaction handler (103), the transaction handler (103) may determine whether the characteristics of the transaction satisfy the conditions specified for an announcement, such as an advertisement, offer or coupon, from a second merchant. If the conditions are satisfied, the transaction handler (103) provides the announcement to the user (101). In one embodiment, the transaction handler (103) may auction the opportunity to provide the announcements to a set of merchants. Examples and details related to the delivery of such announcements in one embodiment are provided in U.S. patent application Ser. No. 12/428,241, filed Apr. 22, 2009 and entitled "Targeting Merchant Announcements Triggered by Consumer Activity Relative to a Surrogate Merchant," the disclosure of which is hereby incorporated herein by reference.

Details about delivering advertisements at a point of interaction that is associated with user transaction interactions in one embodiment are provided in U.S. patent application Ser. No. 12/849,791, filed Aug. 3, 2010 and entitled "Systems and Methods to Deliver Targeted Advertisements to Audience," the disclosure of which is hereby incorporated herein by reference.

On Third Party Site

In a further example, the user (101) may visit a third party website, which is the point of interaction (107) in FIG. 1. The third party website may be a web search engine, a news website, a blog, a social network site, etc. The behavior of the user (101) at the third party website may be tracked via a browser cookie, which uses a storage space of the browser to store information about the user (101) at the third party website. Alternatively, or in combination, the third party website uses the server logs to track the activities of the user (101). In one embodiment, the third party website may allow an advertisement network to present advertisements on portions of the web pages. The advertisement network tracks the user's behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user (101) via analyzing the web pages that the user (101) has visited. Based on the tracked online activities of the user (101), the user data (125) that characterizes the user (101) can be formed to query the profiler selector (129) for a user specific profile (131).

In one embodiment, the cookie identity of the user (101) as tracked using the cookie can be correlated to an account of the user (101), the family of the user (101), the company of the user (101), or other groups that include the user (101) as a member. Thus, the cookie identity can be used as the user data (125) to obtain the user specific profile (131). For example, when the user (101) makes an online purchase from a web page that contains an advertisement that is tracked with the cookie identity, the cookie identity can be correlated to the online transaction and thus to the account of the user (101). For example, when the user (101) visits a web page after authentication of the user (101), and the web page includes an advertisement from the advertisement network, the cookie identity can be correlated to the authenticated identity of the user (101). For example, when the user (101) signs in to a web portal (e.g., 143) of the transaction handler (103) to access the account of the user (101), the cookie identity used by the advertisement network on the web portal (e.g., 143) can be correlated to the account of the user (101).

Other online tracking techniques can also be used to correlate the cookie identity of the user (101) with an identifier of the user (101) known by the profile selector (129), such as a GUID, PAN, account number, customer number, social security number, etc. Subsequently, the cookie identity can be used to select the user specific profile (131).

Multiple Communications

In one embodiment, the entity operating the transaction handler (103) may provide intelligence for providing multiple communications regarding an advertisement. The multiple communications may be directed to two or more points of interaction with the user (101).

For example, after the user (101) is provided with an advertisement via the transaction terminal (105), reminders or revisions to the advertisements can be sent to the user (101) via a separate point of interaction (107), such as a mobile phone, email, text message, etc. For example, the advertisement may include a coupon to offer the user (101) a benefit contingent upon a purchase. If the correlator (117) determines that the coupon has not been redeemed, the correlator (117) may send a message to the mobile phone of the user (101) to remind the user (101) about the offer, and/or revise the offer.

Examples of multiple communications related to an offer in one embodiment are provided in U.S. patent application Ser. No. 12/510,167, filed Jul. 27, 2009 and entitled "Successive Offer Communications with an Offer Recipient," the disclosure of which is hereby incorporated herein by reference.

Auction Engine

In one embodiment, the transaction handler (103) provides a portal (e.g., 143) to allow various clients to place bids according to clusters (e.g., to target entities in the clusters for marketing, monitoring, researching, etc.)

For example, cardholders may register in a program to receive offers, such as promotions, discounts, sweepstakes, reward points, direct mail coupons, email coupons, etc. The cardholders may register with issuers, or with the portal (143) of the transaction handler (103). Based on the transaction data (109) or transaction records (301) and/or the registration data, the profile generator (121) is to identify the clusters of cardholders and the values representing the affinity of the cardholders to the clusters. Various entities may place bids according to the clusters and/or the values to gain access to the cardholders, such as the user (101). For example, an issuer may bid on access to offers; an acquirer and/or a merchant may bid on customer segments. An auction engine receives the bids and awards segments and offers based on the received bids. Thus, customers can get great deals; and merchants can get customer traffic and thus sales.

Some techniques to identify a segment of users (101) for marketing are provided in U.S. patent application Ser. No. 12/288,490, filed Oct. 20, 2008, assigned Pub. No. 2009/0222323, and entitled "Opportunity Segmentation," U.S. patent application Ser. No. 12/108,342, filed Apr. 23, 2008, assigned Pub. No. 2009/0271305, and entitled "Payment Portfolio Optimization," and U.S. patent application Ser. No. 12/108,354, filed Apr. 23, 2008, assigned Pub. No. 2009/0271327, and entitled "Payment Portfolio Optimization," the disclosures of which applications are hereby incorporated herein by reference.

Loyalty Program

In one embodiment, the transaction handler (103) is to host loyalty programs on behalf of various entities, such as merchants, retailers, service providers, issuers, etc. For example, in one embodiment, the portal (143) of the transaction handler (103) is to provide a user interface to present the loyalty programs and allow a user (e.g., 101) to enroll in one or more loyalty programs selected via the user interface.

In one embodiment, the user (101) is to identify himself or herself via an account identifier such as the account information (142) or the account number (302). After the user (101) accepts the terms and conditions for enrolling in a loyalty program, the account identifier of the user (101) is associated with the loyalty program in the data warehouse (149) to indicate the membership of the user (101) in the loyalty program.

In one embodiment, the portal (143) also provides a user interface to the loyalty program sponsor, such as a merchant, to administer the rules of the loyalty program and/or access data stored under the loyalty programs, such as membership information, benefits provided to members, purchase details of members, etc.

In one embodiment, a loyalty program is provided by multiple entities, each having a different role. For example, one or more entities, such as an issuer, are to specify the rules of the loyalty program; and one or more entities, such as merchants and retailers, are to provide funds for the benefits of the loyalty program.

In one embodiment, the entity operating the transaction handler (103) may also provide funds to sponsor a loyalty program and/or specify rules for the loyalty program.

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs.

Since the third party loyalty programs are hosted on the transaction handler (103), the consumers do not have to carry multiple, separate loyalty cards (e.g., one for each merchant that offers a loyalty program); and the merchants do not have to incur a large setup and investment fee to establish the loyalty program.

The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings.

Figure 8:
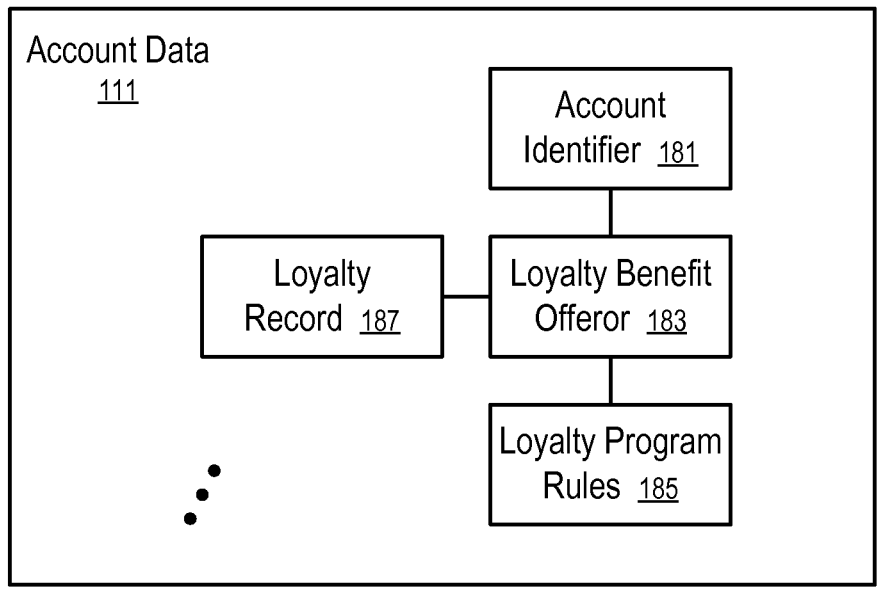
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and the loyalty record (187) for the loyalty program activities of the account identifier (181). In one embodiment, at least part of the data related to the third party loyalty program is stored under the account identifier (181) of the user (101), such as the loyalty record (187).

Figure 10:
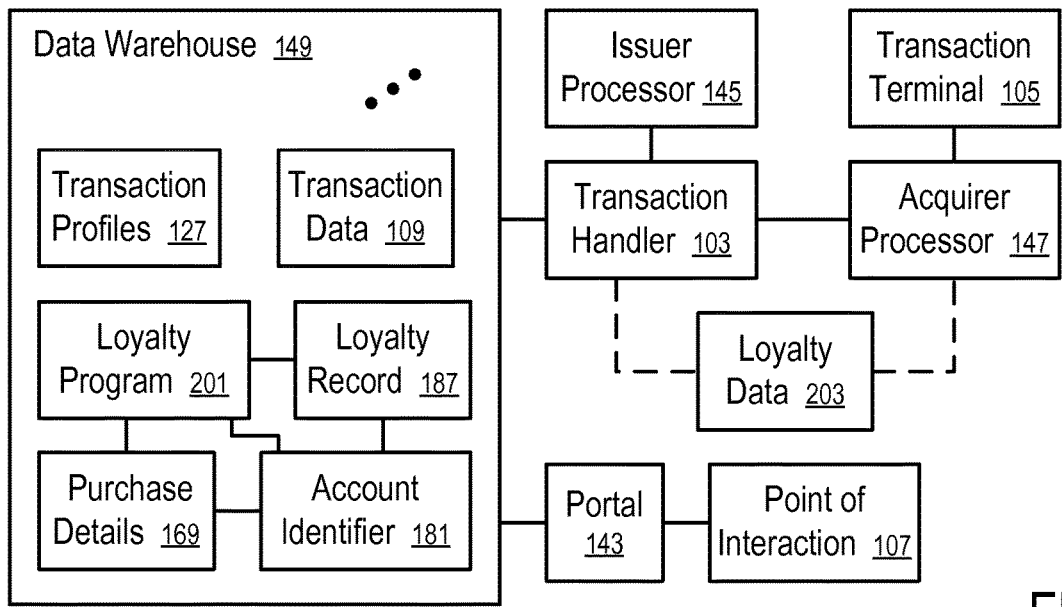
FIG. 10 shows a system to provide loyalty programs according to one embodiment.

FIG. 10 shows a system to provide loyalty programs according to one embodiment. In FIG. 10, the system includes the data warehouse (149) coupled with the transaction handler (103) and the portal (143).

In one embodiment, the data warehouse (149) stores data that represents loyalty programs (e.g., 201). In one embodiment, the loyalty program (201) includes data identifying the loyalty benefit offeror (183) and the loyalty program rules (185).

In one embodiment, the loyalty program rules (185) include the conditions to offer benefits, such as discounts, reward points, cash back, gifts, etc. The portal (143) and/or the transaction handler (103) is to use the loyalty program rules (185) to determine the amount of benefit to which a member (e.g., 101) is entitled (e.g., for completing a transaction). In one embodiment, the loyalty program rules (185) include the eligibility requirements for membership in the loyalty program (201). The portal (143) is to use the loyalty program rules (185) to determine whether a user (101) is eligible for the membership in the loyalty program (201). In one embodiment, the loyalty program rules (185) include the conditions to offer membership; and the portal (143) and/or the transaction handler (103) is to use the loyalty program rules (185) to determine whether or not the provide a membership offer to a user (101) when the user (101) makes a payment transaction via the transaction handler (103) (or when the user (101) visits the portal (143), or in response to other advertising opportunities).

In one embodiment, the loyalty program rules (185) specify conditions based on the transaction data (109) and/or the transaction profiles (127). For example, in one embodiment, the loyalty program rules (185) are to define the membership eligibility based on whether certain values (e.g., 342-347) in the aggregated spending profile (341) of the user (101) are above certain thresholds, within certain ranges, and/or equal to certain predetermined values. Such conditions identify a cluster, segment, or set of users (e.g., 101) based on the past spending behavior of the users (e.g., 101). Details about the profile (e.g., 133 or 341) in one embodiment are provided in the section entitled "TRANSACTION PROFILE" and the section entitled "AGGREGATED SPENDING PROFILE."

In one embodiment, the portal (143) is to provide membership offers to the point of interaction (107) of eligible users (e.g., 101). Details of the point of interaction (107) in one embodiment are provided in the section entitled "POINT OF INTERACTION."

In one embodiment, an advertisement selector (133) is used to identify the membership offers; and the membership offers are provided in response to user data (125).

In one embodiment, the portal (143) is to receive enrollment data from the point of interaction (107) of eligible users (e.g., 101). The portal (143) provides a user interface to the member (e.g., 101) of the loyalty program (201) to view information related to the loyalty program (201), such as accumulated benefits, history of transactions made under the loyalty program (201), etc.

In one embodiment, the portal (143) also allows the loyalty benefit offerors (183) to view the information related to the loyalty program (201) of the members of the loyalty program (201). In one embodiment, enrolling in the loyalty program (201) includes providing consent to allow the portal (143) to track the information related to the loyalty program (201) and grant the loyalty benefit offerors (183) access to the information related to the loyalty program (201).

In one embodiment, the loyalty benefit offerors (183) are to use the portal (143) to determine whether a user (e.g., 101) in possession of an account identification device (141) identifying the account identifier (181) is a member of the loyalty program (201).

In one embodiment, enrolling in the loyalty program (201) includes providing consent to allow the portal (143) to track purchase details (169) for purchases made from a set of merchants, which merchants may or may not be the loyalty benefit offeror (183). When the transaction handler (103) receives an authorization request (168) from the transaction terminal (105) via the acquirer processor (147) of the corresponding merchant, the transaction handler (103) is to use the data warehouse (149) to determine whether or not to request transaction details from the merchant.

In one embodiment, if the account identifier (181) in the authorization request from a merchant is associated with a loyalty program (e.g., 201) that requires the tracking of the purchase details (169) for transactions performed at the merchant, the transaction handler (103) and/or the portal (143) is to request the purchase details (169).

Figure 9:
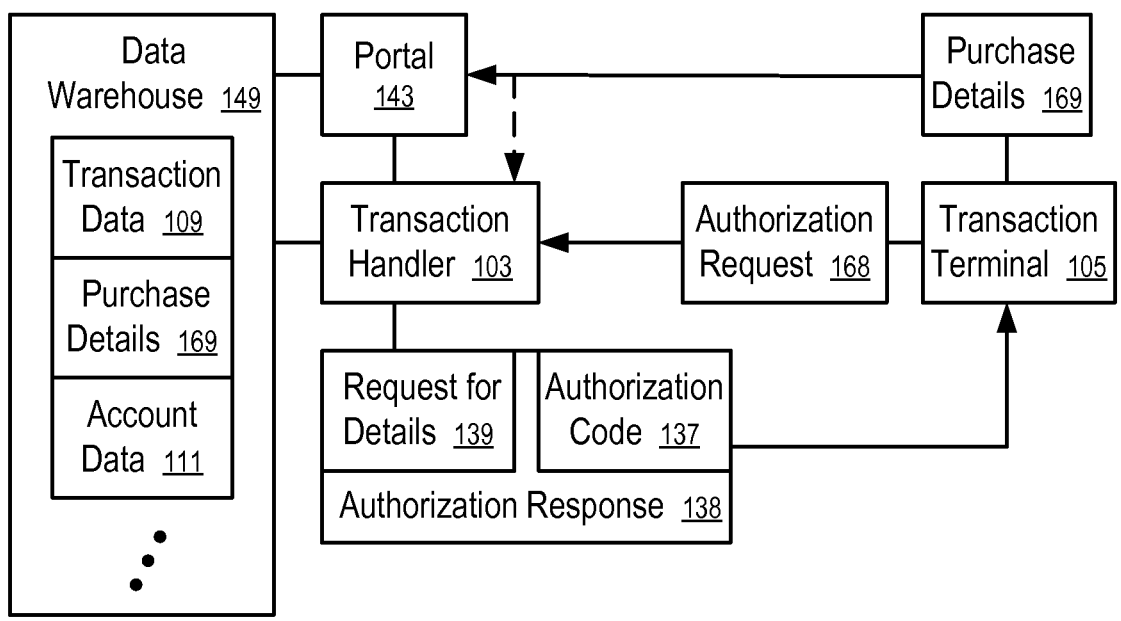
FIG. 9 shows a system to obtain purchase details according to one embodiment.

For example, in one embodiment, the transaction handler (103) is to embed the request (139) for purchase details (169) in the authorization response (138), as illustrated in FIG. 9.

In one embodiment, the transaction handler (103) is to use the communication link with the transaction terminal (105), through the acquirer processor (147), to communicate loyalty data (203). For example, in one embodiment, the transaction handler (103) is to provide the identification of the loyalty program (201) in the authorization response (138) to indicate that the corresponding user (101) making the purchase is a member of the loyalty program (201). For example, in one embodiment, the transaction handler (103) is to receive the requested purchase details (169) from the transaction terminal (105), through the acquirer processor (147).

In one embodiment, the portal (143) is used to receive the purchase details (169) from the merchant operating the transaction terminal (105). In response to the request (139) embedded in the authorization response (138), the merchant is to save the purchase details (169) in a file and transmit the file with purchase details of other transactions to the portal (143) (e.g., at the time of submitting the transactions for settlement, or at a regular and/or predefined time interval).

In one embodiment, the portal (143) is used to receive the purchase details (169) to avoid slowing down the transaction handler (103). In one embodiment, the portal (143) is further used to transmit the request (139) for purchase details (169).

In one embodiment, the purchase details (169) individually identify the items purchased and their prices. In one embodiment, the purchase details (169) are used to determine the benefits to be awarded to the account identifier (181). For example, in some embodiments, certain purchased items are eligible for benefits; and other purchased items are not eligible for benefits. For example, in some embodiments, purchased items in some categories are eligible for more benefits (e.g., according to a first percentage number); and purchased items are other categories eligible for less benefits (e.g., according to a second percentage number). In one embodiment, the purchase details (169) are not required to determine the benefits, such as when the benefits are based on the total transaction amount.

In one embodiment, the benefits are provided in the form of statement credits. For example, in one embodiment, during the settlement of the transaction, the transaction handler (103) is to communicate with the issuer processor (145) associated with the account identifier (181) and the acquirer processor (147) is to modify the transaction to include the statement credits, so that the user (101) receives the discount via the statement credits and the merchant provides the benefit via the price discount. When the benefit is provided by a third party that is not the merchant involved in the transaction, the transaction handler (103) is to use the data about the loyalty benefit offeror (183) to settle the cost for providing the statement credits.

Figure 11:
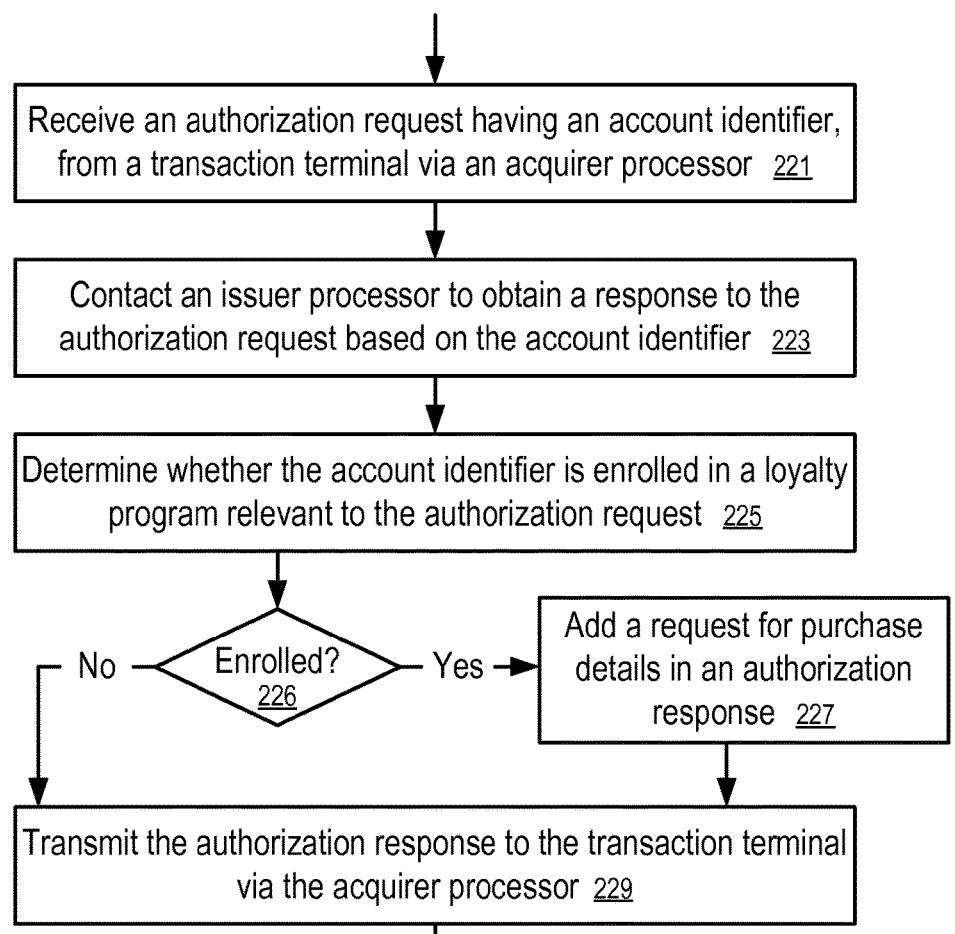
FIG. 11 shows a method to administrate a loyalty program according to one embodiment.

FIG. 11 shows a method to administrate a loyalty program according to one embodiment. In FIG. 11, a computing apparatus is configured to receive (221), from a transaction terminal (105) via an acquirer processor (147), an authorization request (168) having an account identifier (181), contact (223) an issuer processor (145) to obtain a response to the authorization request (168) based on the account identifier (181), and determine (225) whether the account identifier (181) is enrolled in a loyalty program (201) relevant to the authorization request (168). If it is determined (226) that the account identifier (181) is enrolled in one of the loyalty programs (e.g., 201) hosted on the computing apparatus, the computing apparatus is to add (227) a request (139) for purchase details (169) in an authorization response (138). The computing apparatus is to transmit (229) the authorization response (138) to the transaction terminal (105) via the acquirer processor (147). In one embodiment, the authorization response (138) includes an authorization code (137) to confirm the authorization of the transaction; and the computing apparatus is to receive the transaction details (169) from the merchant together with the request to settle the transaction that was authorized by the authorization response (138). In one embodiment, the authorization code (137) is based on the response from the issuer processor (145) regarding the authorization request (168).

Examples of loyalty programs offered through collaboration between collaborative constituents in a payment processing system, including the transaction handler (103) in one embodiment are provided in U.S. patent application Ser. No. 11/767,202, filed Jun. 22, 2007, assigned Pub. No. 2008/0059302, and entitled "Loyalty Program Service," U.S. patent application Ser. No. 11/848,112, filed Aug. 30, 2007, assigned Pub. No. 2008/0059306, and entitled "Loyalty Program Incentive Determination," and U.S. patent application Ser. No. 11/848,179, filed Aug. 30, 2007, assigned Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned Pub. No. 2008/0059303, and entitled "Transaction Evaluation for Providing Rewards," the disclosure of which is hereby incorporated herein by reference.

In one embodiment, the incentive, reward, or benefit provided in the loyalty program (201) is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program (201). For example, issuers or merchants may sponsor the loyalty program (201) to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (e.g., 105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned Pub. No. 2010-0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in U.S. patent application Ser. No. 12/566,350, filed Sep. 24, 2009 and entitled "Real-Time Statement Credits and Notifications," the disclosure of which is hereby incorporated herein by reference.

Details on loyalty programs in one embodiment are provided in U.S. patent application Ser. No. 12/896,632, filed Oct. 1, 2010 and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

Details on SKU-level profile in one embodiment are provided in U.S. patent application Ser. No. 12/899,144, filed Oct. 6, 2010 and entitled "Systems and Methods for Advertising Services Based on an SKU-Level Profile," the disclosure of which is hereby incorporated herein by reference.

Purchase Details

In one embodiment, the transaction handler (103) is configured to selectively request purchase details via authorization responses. When the transaction handler (103) (and/or the issuer processor (145)) needs purchase details, such as identification of specific items purchased and/or their prices, the authorization responses transmitted from the transaction handler (103) is to include an indicator to request for the purchase details for the transaction that is being authorized. The merchants are to determine whether or not to submit purchase details based on whether or not there is a demand indicated in the authorization responses from the transaction handler (103).

FIG. 9 shows a system to obtain purchase details according to one embodiment. In FIG. 9, when the user (101) uses the consumer account (146) to make a payment for a purchase, the transaction terminal (105) of the merchant or retailer sends an authorization request (168) to the transaction handler (103). In response, an authorization response (138) is transmitted from the transaction handler (103) to the transaction terminal (105) to inform the merchant or retailer of the decision to approve or reject the payment request, as decided by the issuer processor (145) and/or the transaction handler (103). The authorization response (138) typically includes an authorization code (137) to identify the transaction and/or to signal that the transaction is approved.

In one embodiment, when the transaction is approved and there is a need for purchase details (169), the transaction handler (103) (or the issuer processor (145)) is to provide an indicator of the request (139) for purchase details in the authorization response (138). The optional request (139) allows the transaction handler (103) (and/or the issuer processor (145)) to request purchase details (169) from the merchant or retailer on demand. When the request (139) for purchase details is present in the authorization response (138), the transaction terminal (105) is to provide the purchase details (169) associated with the payment transaction to the transaction handler (103) directly or indirectly via the portal (143). When the request (139) is absent from the authorization response (138), the transaction terminal (105) does not have to provide the purchase details (169) for the payment transaction.

In one embodiment, when the transaction is approved but there is no need for purchase details (169), the indicator for the request (139) for purchase details is not set in the authorization response (138).

In one embodiment, prior to transmitting the authorization response (138), the transaction handler (103) (and/or the issuer processor (145)) determines whether there is a need for transaction details. In one embodiment, when there is no need for the purchase details (169) for a payment transaction, the request (139) for purchase details (169) is not provided in the authorization response (138) for the payment transaction. When there is a need for the purchase details (169) for a payment transaction, the request (139) for purchase details is provided in the authorization response (138) for the payment transaction. The merchants or retailers do not have to send detailed purchase data to the transaction handler (103) when the authorization response message does not explicitly request detailed purchase data.

Thus, the transaction handler (103) (or the issuer processor (145)) does not have to require all merchants or retailers to send the detailed purchase data (e.g., SKU level purchase details) for all payment transactions processed by the transaction handler (103) (or the issuer processor (145)).

For example, when the consumer account (146) of the user (103) has collected a manufacturer coupon for a product or service that may be sold by the merchant or retailer operating the transaction terminal (105), the transaction handler (103) is to request the purchase details (169) via the authorization response (138) in one embodiment. If the purchase details (169) show that the conditions for the redemption of the manufacturer coupon are satisfied, the transaction handler (103) is to provide the benefit of the manufacturer coupon to the user (101) via credits to the statement for the consumer account (146). This automation of the fulfillment of manufacturer coupon releases the merchant/retailer from the work and complexities in processing manufacturer offers and improves user experiences. Further, retailers and manufacturers are provided with a new consumer promotion distribution channel through the transaction handler (103), which can target the offers based on the transaction profiles (127) of the user (101) and/or the transaction data (109). In one embodiment, the transaction handler (103) can use the offer for loyalty/reward programs.

In another example, if the user (101) is enrolled in a program to request the transaction handler (103) to track and manage purchase details (169) for the user (103), the transaction handler (103) is to request the transaction details (169) via the authorization response (138).

In one embodiment, a message for the authorization response (138) is configured to include a field to indicate whether purchase details are requested for the transaction.

In one embodiment, the authorization response message includes a field to indicate whether the account (146) of the user (101) is a participant of a coupon redemption network. When the field indicates that the account (146) of the user (101) is a participant of a coupon redemption network, the merchant or retailer is to submit the purchase details (169) for the payment made using the account (146) of the user (101).

In one embodiment, when the request (139) for the purchase details (169) is present in the authorization response (138), the transaction terminal (105) of the merchant or retailer is to store the purchase details (169) with the authorization information provided in the authorization response (138). When the transaction is submitted to the transaction handler (103) for settlement, the purchase details (169) are also submitted with the request for settlement.

In one embodiment, the purchase details (169) are transmitted to the transaction handler (103) via a communication channel separate from the communication channel used for the authorization and/or settlement requests for the transaction. For example, the merchant or the retailer may report the purchase details to the transaction handler (103) via a portal (143) of the transaction handler (103). In one embodiment, the report includes an identification of the transaction (e.g., an authorization code (137) for the payment transaction) and the purchase details (e.g., SKU number, Universal Product Code (UPC)).

In one embodiment, the portal (143) of the transaction handler (103) may further communicate with the merchant or the retailer to reduce the amount of purchase detail data to be transmitted the transaction handler (103). For example, in one embodiment, the transaction handler (103) provides an indication of categories of services or products for which the purchase details (169) are requested; and the merchant or retailer is to report only the items that are in these categories. In one embodiment, the portal (143) of the transaction handler (103) is to ask the merchant or the retailer to indicate whether the purchased items include a set of items required for the redemption of the offers.

In one embodiment, the merchant or retailer is to complete the purchase based upon the indication of approval provided in the authorization response (138). When the indicator (e.g., 139) is present in the authorization response (138), the merchant (e.g. inventory management system or the transaction terminal (105)) is to capture and retain the purchase details (169) in an electronic data file. The purchase details (169) include the identification of the individual items purchased (e.g., SKU and/or UPC), their prices, and/or brief descriptions of the items.

In one embodiment, the merchant or retailer is to send the transaction purchase data file to the transaction handler (103) (or the issuer processor (145)) at the end of the day, or according to some other prearranged schedule. In one embodiment, the data file for purchase details (169) is transmitted together with the request to settle the transaction approved via the authorization response (138). In one embodiment, the data file for purchase details (169) is transmitted separately from the request to settle the transaction approved via the authorization response (138).

Further details and examples of one embodiment of offer fulfillment are provided in U.S. patent application Ser. No. 13/113,710, filed May 23, 2011 and entitled "Systems and Methods for Redemption of Offers," the disclosure of which is hereby incorporated herein by reference.

Data Integration Engine

In one embodiment, a data service providing system uses an input engine and a broker engine to integrate diverse data sources for unified access, enhanced security, reduced cost, and flexible management.

Figure 12:
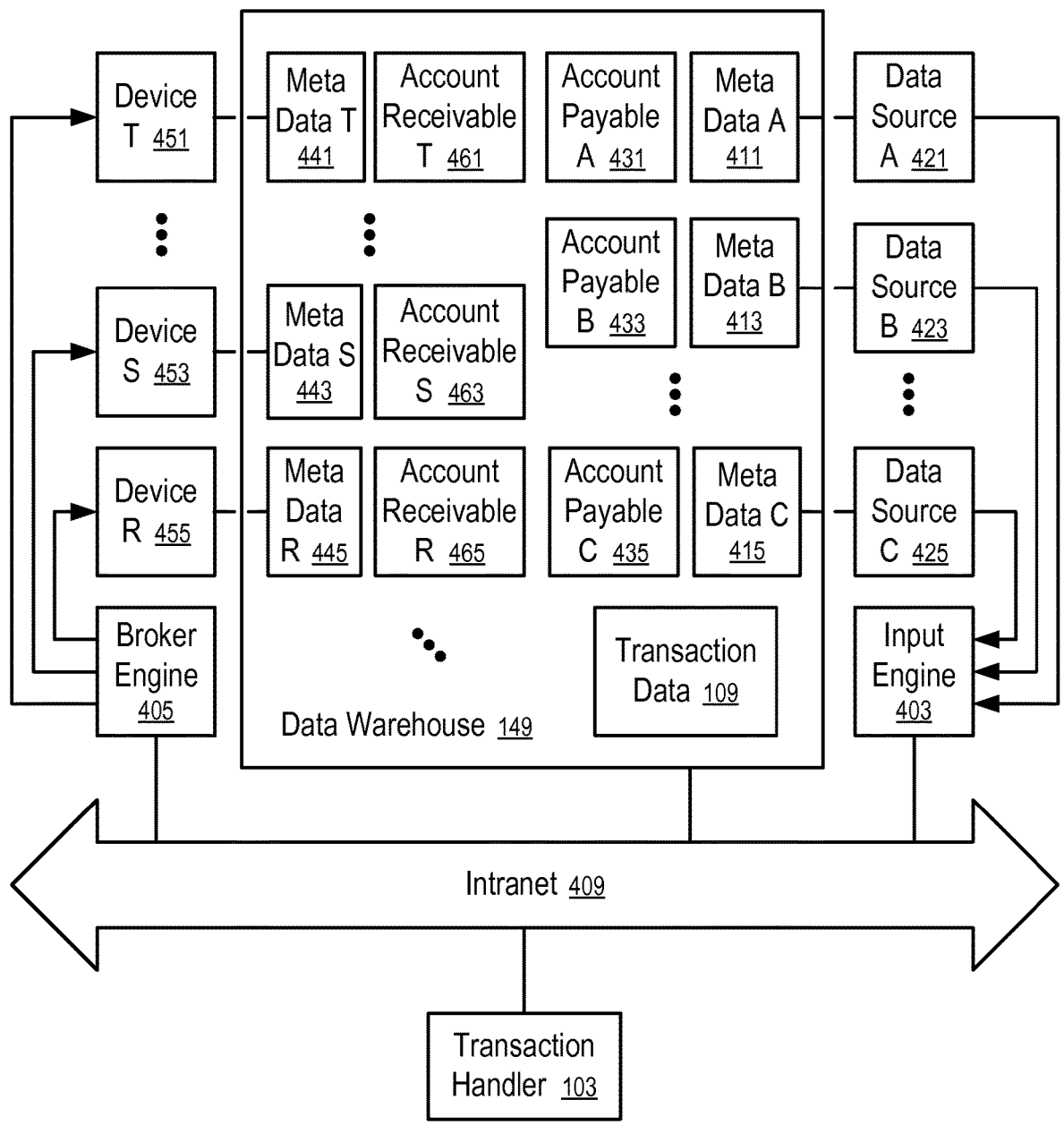
FIG. 12 shows a system to provide data services according to one embodiment.

FIG. 12 shows a system to provide data services according to one embodiment. In FIG. 12, the input engine (403) and the broker engine (405) are controlled by meta data (411-415 and 441-445) to virtually integrate diverse data available in the data warehouse (149) of the transaction handler (103) and in external data sources (e.g., 421-425). Though the use of the input engine (403) and the broker engine (405), the system provides improved control of the data, improves data security, reduces data access cost, and allows the control of various aspects of providing data services, such as risk management, legal issues, privacy concerns, financial rules, etc. Thus, the data services can be provided in a unified and centralized way.

In FIG. 12, the same input engine (403) is controlled by meta data (411-415) to access the respective data sources (421-425). The input engine (403) allows the data in the data sources (421-425), which are external to the data warehouse (149) (and/or external to the intranet (409) of the transaction handler (103)), to be virtually integrated with the data in the data warehouse (149) as a unified data source.

In one embodiment, the input engine (403) is used to provide the unified data source service via a mirror copy of the data from the external data sources (421-425) and/or via real time access to the external data sources (421-425). The input engine (403) meters the usage of the data obtained from the external data sources (421-425) to generate account payable data (431-435) for the respective data sources (421-425).

In one embodiment, the input engine (403) is driven by meta data (411-415) to provide the flexibility of meeting the challenges in the diversity of the third party data and the complexity in the payment rules of different third party data. For example, the meta data (411-415) is used to specify what the third party data is, the characteristics of the third party data, how the third party data can be used, how to meter the usage of the third party data, and how to bill for the usage of the third party data, etc. The input engine (403) is configured to generate the account payable data (431-435) based on the actual usage. Thus, the need to rely upon a flat fee for the right to access portions or all of the data from a third party database (e.g., 421, 423, or 425) can be eliminated.

In one embodiment, the input engine (403) virtually integrates the third party data (e.g., from the data sources (421-425)) with the native data of the data warehouse (149), such as transaction data (109), transaction profiles (127), account data (111), correlation results (123), etc., for internal and/or external uses relative to the intranet (409) of the transaction handler (103). Expertise in data security for the data warehouse (149) can be leveraged to secure the combined data and/or the access to the third party data.

In one embodiment, the data security measures designed to protect the data actually residing in the data warehouse (149) is also used to protect the data virtually residing in the data warehouse (149) but actually provided by the data sources (421-425) located outside the intranet (409). When the data access is arranged through the broker engine (405) and the input engine (403), the security of the data can be improved via the security measures provided within the intranet (409).

In one embodiment, usage based payment models allow the reduction of data access cost and may offer the third party data providers with opportunities to bring in more revenue (e.g., by providing data to more users without having to charge large flat fees to grant access to individual customers).

In one embodiment, the interaction between the input engine (403) and each of the data sources (421-425) is based on the corresponding meta data (e.g., 411-415). For example, in FIG. 12, the meta data (411) corresponds to the data source (421). After the meta data (411) is added to the data warehouse (149), the input engine (403) virtually integrates the data of the data source (421) into the dataset serviced by the system. The data warehouse (149) may store a mirror copy of the data obtained from the data source (421) to service the data needs within the intranet (409) and/or data needs from outside the intranet (409). Alternatively or in combination, the input engine (403) may obtain the data on demand from the data source (421) in response to requests that involve the data of the data source (421). The usage of the data from the data source (421) is metered for appropriate payments to the operator of the data source (421), regardless of whether or not the data is mirrored in the data warehouse. In one embodiment, if the meta data (411) is removed from the data warehouse (149), the data of the data source (421) is removed from the dataset serviced by the system.

In one embodiment, the meta data (411) identifies the data access interfaces for interacting with the data source (421). The input engine (403) can interface with the data source (421) based on the meta data (411), without having to restart, or be reprogrammed. Thus, the data of the data source (421) can be dynamically added to the dataset serviced by the system via the addition of the meta data (411), without having to interrupt the data access to other data sources (e.g., 413-415).

In one embodiment, the meta data (411) specifies data access policies, such as whether the data warehouse (149) can cache a portion of the data of the data source (421), the billing models for data items of the data source (421), access restrictions imposed on the data of the data source (421), etc.

Further examples of meta data for the control of the input engine (403) are described below in connection with FIG. 15.

In FIG. 12, the broker engine (405) provides a uniform access point to allow the data consuming devices (451-455) of various partners or customers to access certain parts of the combined data, such as the transaction data (109), the transaction profiles (127) and the correlation results (123) that are generated using the transaction data (109) and some of the external data sources (421-425), and the data provided by the external data sources (421-425).

In one embodiment, the broker engine (405) delivers data via a data services platform that can provide data on demand in real time, or in batch mode (e.g., as subscriptions). In one embodiment, the data services platform includes subscription services, report delivery options, a web portal (e.g., 143) for business intelligence, a data store for real time data service objects, web services, services clients, and application programming interfaces (API) for ab initio queries (e.g., expressed in a structured query language (SQL)), business intelligence, etc.

In one embodiment, the broker engine (405) is used to provide data access not only to the data consuming devices (451-455) located outside the intranet (409), but also to the data consuming devices that may be located within the intranet (409), such as the profile generator (121), the correlator (117), the profile selector (129) and/or the advertisement selector (133).

In one embodiment, the broker engine (405) provides controls in various areas, such as risk management, legal issues, privacy concerns, financial rules, etc., in accordance with the meta data (441-445) corresponding to the data consuming devices (451-455).

In one embodiment, the broker engine (405) is driven by the meta data (441-445) to provide "plug and play" types of access connections for various data consuming devices (451-455). The data can be accessed through the broker engine (405) in real time, or in batch mode (e.g., provided via subscription files). The broker engine (405) is to meter the data usage and generate account receivable data (461-465) for the respective data consuming devices (451-455), based on the actual data usage.

In one embodiment, each of meta data (441-445) corresponds to a data consuming device (e.g., 451-455) or a data user. For example, the meta data (441) corresponds to the data consuming device (451). After the meta data (441) is added to the data warehouse (149), the data consuming device (451) can access data via the broker engine (405). If the meta data (441) is removed from the data warehouse (149), the broker engine (405) denies the data consuming device (451) data access.

In one embodiment, the meta data (441) identifies the data consuming device (451) and specifies data access policies for the data consuming device (451), including data access privilege of data items accessible to the data consuming device (451), data format for data to be provided to the data consuming device (451), a billing model for data items to be provided to the data consuming device (451), and other aspects related to risk management, legal issues, privacy concerns, financial rules, etc.

In one embodiment, the meta data (441-445) provides information for the broker engine (405) to interface with different data consuming devices (451-455) that may have different data accessing interfaces. A data consuming device (e.g., 451) can be added to access the dataset serviced by the system via the broker engine (405) by the addition of the meta data (441), without the need to modify the broker engine (405). Thus, the data consuming device (e.g., 451) can be dynamically added to access the dataset serviced by the system, without interrupting the services to other data consuming devices (e.g., 453-455). Further, the data services for the data consuming device (451) can be modified on the fly via modifying the respective meta data (441), without restarting the broker engine (405) and/or interrupting the data services for other data consuming devices (e.g., 451-455).

In one embodiment, the system is configured to settle the account receivables (461-465) and the account payables (431-435) via transactions initiated by the transaction handler (103). In one embodiment, the payments for data of the data sources (421-425) accessed via the input engine (403) and charges for data provided via the broker engine (405) are processed in response to respective data usage and/or data access. In another embodiment, the payments and the charges are recorded for periodic settlement (e.g., via weekly, monthly, quarterly, or yearly billing).

In one embodiment, the broker engine (405) provides data access not only to the data consuming devices (451-455) that are outside the intranet (409) of the transaction handler (103), but also to the data consuming devices connected within the intranet (409), such as correlator (117), a transaction statistics generator, a report generator, etc., which may use both the data in the data warehouse (149) and data from the third party data sources (421-425). Thus, the usage of the data supplied by the external data sources (421-425) can be measured to generate the account payable data (431-435) for internal use within the intranet (409).

In one embodiment, the data warehouse (149) includes transaction data (109) recorded based on transactions processed by the transaction handler (103). The data warehouse (149) may further include data derived at least in part from the transaction data (109), such as transaction statistics, transaction profiles (127), benchmark reports, correlation results (123), purchase details (169), loyalty record (187), etc.

Examples of partners or customers that may operate the data consuming devices (451-455) include issuers, acquirers, search engines, marketers, researchers, media response measurers, publishers, etc. For example, a profile generator (121) is connected to the intranet (409) to generate transaction profiles (127) based on the transaction data (109). The transaction profiles (127) summarize the spending patterns of various customers, which can be provided to search engines, issuers, acquirers, merchants, or marketers to prioritize, generate, select, adjust, customize, and/or personalize content, advertisements and/or offers (e.g., 119).

In one embodiment, the account receivable information (461-465) includes billing information. When the data used by the data consuming devices (451-455) includes or uses the data from the external data sources (421-425), the input engine (403) also generates the respective account payable data (431-435) in addition to the broker engine (405) generating the account receivable information (461-465). In some embodiments, a separate account engine is used to generate the account payable information (431-435), the account receivable information (461-465), and/or billing information, based on the data usage measurements provided by the input engine (403) and the broker engine (405).

Figure 15:
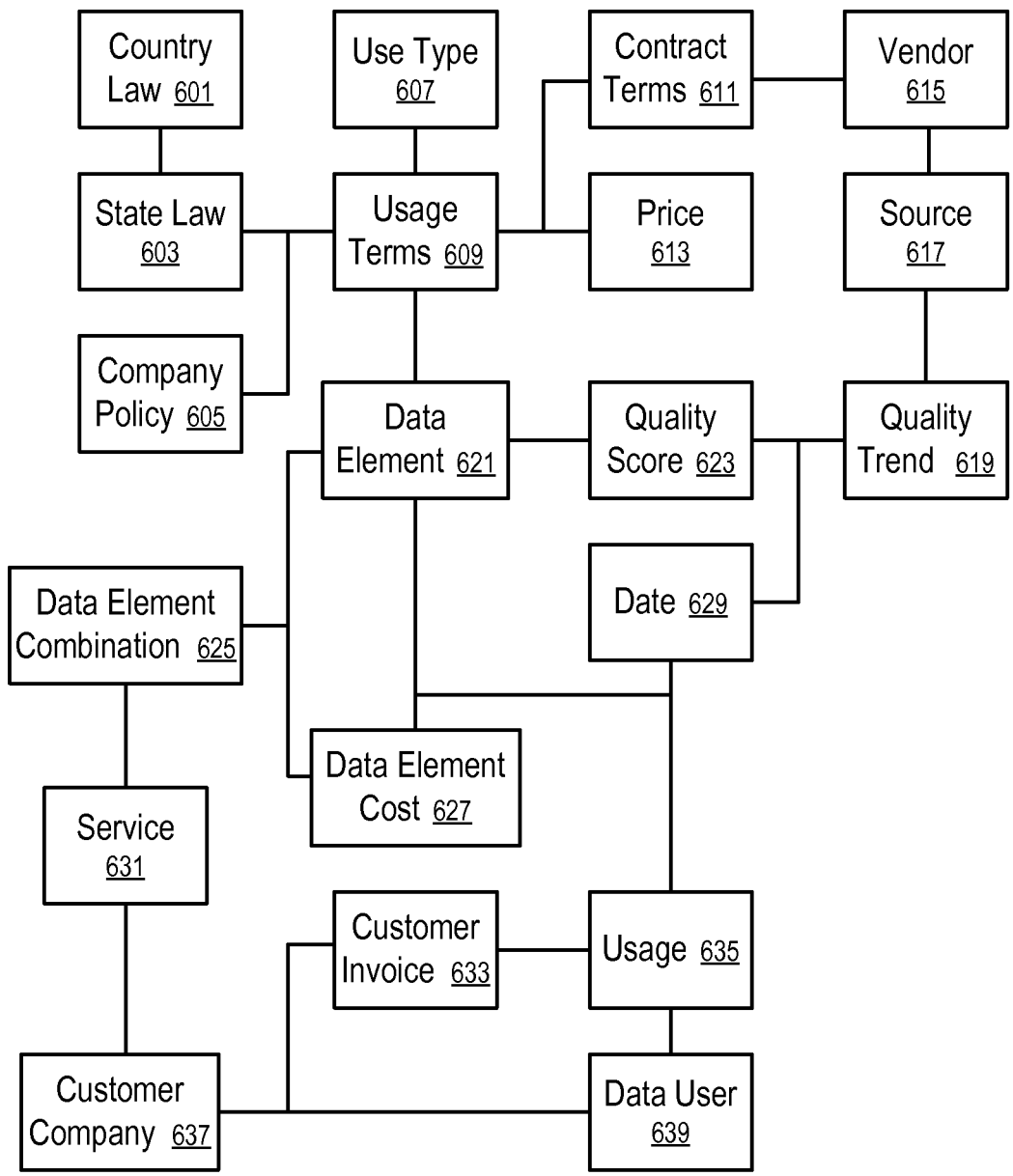
FIG. 15 shows examples of meta data that can be used to control the input engine and the broker engine according to one embodiment.

FIG. 15 shows examples of meta data that can be used to control the input engine and the broker engine according to one embodiment. In FIG. 15, the categories of meta data include data that describes the restrictions of data usages, such as country law (601), state law (603) and company policy (605). A data source (e.g., 421) may further specify meta data related to usage terms (609) for various use types (607).

In one embodiment, meta data can be used to specify different usage terms (609) for different use types (607) or contexts. For example, a consultant may submit the same query for data in multiple projects. The data services platform of the broker engine (405) is configured to track the context of the projects as classified by the use types (607). Since different use types (607) may have different usage terms (609), the same query may be responded to with different data sets as constrained by the different sets of usage terms (609).

In one embodiment, the usage terms (609) include prices (613) and contract terms (611) for the associated data vendor (615) and data source (617) (e.g., 421, 425, or 149).

In one embodiment, the usage terms (609) include the definition of data elements (621) and indication of quality score (623) and quality trend (619) at respective dates (629). The description of the data elements (621) and quality information (e.g., 623 and 619) allows the data to be discovered in an automated way.

In one embodiment, the data element cost (627) is also defined via meta data for the respective data elements (621) and/or the data element combinations (625). Through the meta data defining the combinations (625) of data elements (621), the cost of the new data elements generated through the use of the combinations of existing data elements can computed in an automated way. Further, the access policies/restrictions can also be computed from the combination of the lower level data elements (621).

In one embodiment, the data services (631) available to the customer companies (637) and the individual data user (639) are specified via meta data for the broker engine (405) to control data access. The broker engine (405), the input engine (403) and/or a separate account engine is configured to track the usage (635) as defined by meta data for the respective data services (631) provided to the customer companies (637) and the individual data user (639). Further, the rules and formulae for computing the customer invoices (633) are also defined via meta data based on the meta data that defines the usage (635). The customer invoices (633) are used to generate the account receivable information (461-465).

Figures 13, 14:
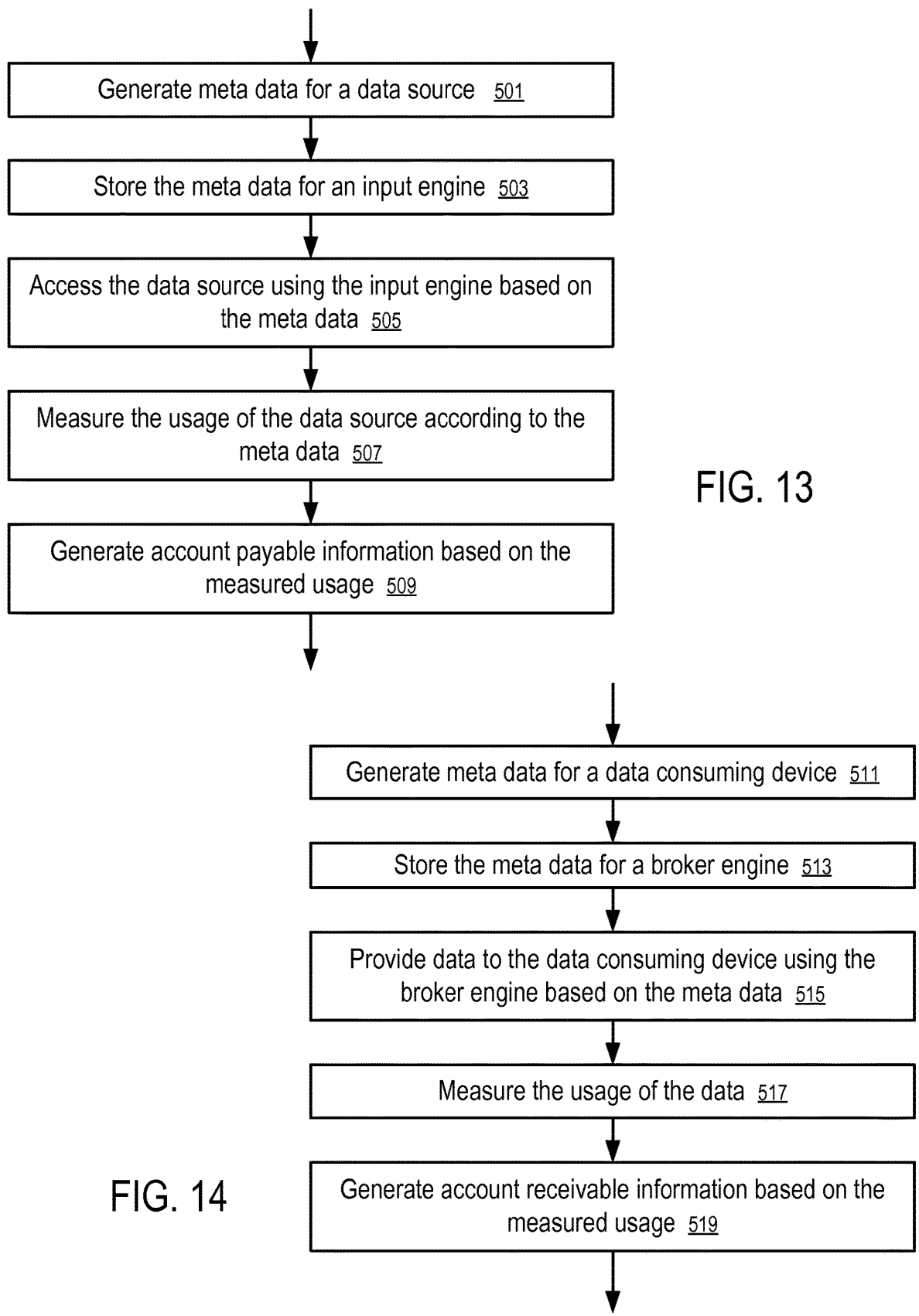
FIG. 13 shows a method to access data according to one embodiment.
FIG. 14 shows a method to provide data according to one embodiment.

FIG. 13 shows a method to access data according to one embodiment. In FIG. 13, a computing apparatus is configured to generate (501) meta data (e.g., 411) for a data source (e.g., 421), store (503) the meta data (e.g., 411) for an input engine (403), access (505) the data source (e.g., 421) using the input engine (403) based on the meta data (e.g., 411), measure (507) the usage of the data source (e.g., 421) according to the meta data (e.g., 411), and generate (509) account payable information (e.g., 431) based on the measured usage.

In one embodiment, the input engine (403) is to provide access to the data in the plurality of external data sources (421-425) and/or the data in the data warehouse (149) via a uniform interface.

In one embodiment, the meta data (411-415) indicate that the plurality of external data sources (421-425) use different billing models for different data.

In one embodiment, an intranet (409) is used to couple the data warehouse (149) and the input engine (403) to integrate access to the transaction data (109) stored in the data warehouse (149) and the data in the plurality of external data sources (421-425), where the plurality of external data sources (421-425) are external to the intranet (409).

FIG. 14 shows a method to provide data according to one embodiment. In FIG. 14, a computing apparatus is configured to generate (511) meta data (e.g., 445) for a data consuming device (455), store (513) the meta data (e.g., 445) for a broker engine (405), provide (515) data (e.g., 401, and/or data in data sources (421-425)) to the data consuming device (455) using the broker engine (405) based on the meta data (e.g., 445), measure (517) the usage of the data (e.g., 401, and/or data in data sources (421-425)), and generate (519) account receivable information (e.g., 465) based on the measured usage.

In one embodiment, the broker engine (405) is to selectively provide the data consuming device (e.g., 455) with access to the data (e.g., 401, and/or data in data sources (421-425)) based on the respective meta data (e.g., 445). For example, the meta data (445) specify a portion that is not accessible to the respective data consuming device (455) and a portion that is accessible to the respective data consuming device (455). For example, the meta data (445) may specify the privacy policy, security policy, legal notifications, billing models, data formats, etc. for the data consuming device (455). Thus, once the meta data (445) is stored and linked to the consuming device (455), the consuming device (445) can access the virtually combined data via the broker engine (405).

In one embodiment, the meta data (441-445) indicate that the plurality of data consuming devices (451-455) are billed via different models for different data, granted different privileges for accessing the virtually combined data, configured to receive data in different formats, etc.

Examples of providing information based on transaction data for targeted advertisement and details about transaction handler (103) and other components, such as profile generator (121), transaction terminal (105), etc., can be found in the sections entitled "TRANSACTION DATA BASED PORTAL," "TRANSACTION TERMINAL," "TRANSACTION PROFILE," "AGGREGATED SPENDING PROFILE," "ON ATM & POS TERMINAL," "ON THIRD PARTY SITE," and in other sections.

In one embodiment, the computing apparatus includes: a transaction handler (103) configured to process transactions; a data warehouse (149) configured to store meta data (e.g., 411-415 and 441-445) and first data including transaction data (109) recording the transactions and information generated based on the transaction data (109); an intranet (409) coupled between the data warehouse (149) and the transaction handler (103); an input engine (403) coupled between the intranet (409) and a plurality of data sources (421-425) outside the intranet (409) and controlled by the meta data (e.g., 411-415) to access the data sources (421-425) to provide second data; and a broker engine (405) coupled between the intranet (409) and a plurality of data consuming devices (e.g., 451-455) outside the intranet (409) and controlled by the meta data (e.g., 441-445) to control access of the data consuming devices (e.g., 451-455) to the first data and the second data.

In one embodiment, the input engine (403) is configured to measure usage of the plurality of data sources (421-425) based on the meta data (e.g., 411-415) and generate account payable information (431-435) for the plurality of data sources (421-425) based on the usage measured by the input engine (403); and the broker engine (405) is configured to measure data usage by the plurality of data consuming devices (e.g., 451-455) based on the meta data (e.g., 441-445) and generate account receivable information for the plurality of data consuming devices (e.g., 451-455).

In one embodiment, the meta data (e.g., 411-415 and 441-445) include a plurality of meta data portions (e.g., 411-415) corresponding to the plurality of data sources (421-425), each respective portion of the meta data portions (e.g., 411-415) controlling the input engine (403) to access a respective data source in the plurality of data sources (421-425); and the plurality of data sources (421-425) use a plurality of different data management systems.

In one embodiment, the respective data source is addable into a dataset accessible via the broker engine (405) via addition of the respective portion of the meta data (e.g., 411-415) without modifying the input engine (403) or the broker engine (405).

In one embodiment, the meta data (e.g., 411-415 and 441-445) include a plurality of meta data portions (e.g., 441-445) corresponding to the plurality of data consuming devices (e.g., 451-455), each respective portion of the meta data portions (e.g., 441-445) controlling the broker engine (405) in providing a respective data consuming device (e.g., 451-455) of the plurality of data consuming devices (e.g., 451-455) with data access to the first data and the second data.

In one embodiment, the respective consuming device (e.g., 451-455) is allowed to access a dataset accessible via the broker engine (405) via addition of the respective portion of the meta data (e.g., 441-445) without modifying the input engine (403) or the broker engine (405). In one embodiment, the respective portion of the meta data (e.g., 441-445) identifies a first portion of the dataset that is accessible to the respective consuming device (e.g., 451-455) and a second portion of the dataset that is not accessible to the respective consuming device (e.g., 451-455).

In one embodiment, the account receivable information (461-465) and the account payable information (431-435) are based on a plurality of different billing models.

In one embodiment, the computing apparatus further includes a profile generator (121) configured to generate transaction profiles (127) summarizing transactions of the respective consumers; and the information generated based on the transaction data (109) includes the transaction profiles (127) of the respective consumers.

In one embodiment, at least a portion of the first data is generated based on the transaction data (109) stored in the data warehouse (149) and a portion of the second data provided by the input engine (403).

In one embodiment, the computing apparatus includes: a data warehouse (149) storing transaction data (109) and meta data (e.g., 411-415); and an input engine (403) coupled with the data warehouse (149) to interface with a plurality of external data sources (e.g., 421-425) based on the meta data (e.g., 411-415) specified for the plurality of external data sources (e.g., 421-425) respectively.

In one embodiment, the input engine (403) provides access to data in the plurality of external data sources (e.g., 421-425) via a uniform interface, and measures usage of the data in the plurality of external data sources (e.g., 421-425) to generate account payable information (431-435) according to the meta data (e.g., 411-415). In one embodiment, the meta data (e.g., 411-415) indicate that the plurality of external data sources (e.g., 421-425) use different billing models for different data.

In one embodiment, the computing apparatus further includes an intranet (409) to couple the data warehouse (149) and the input engine (403) to integrate access to the transaction data (109) and the data in the plurality of external data sources (e.g., 421-425), where the plurality of external data sources (e.g., 421-425) are external to the intranet (409).

In one embodiment, the computing apparatus includes at least one data source (e.g., 149) storing meta data (e.g., 441-445); and a broker engine (405) coupled with the at least one data source (e.g., 149) to interface with a plurality of data consuming devices (e.g., 451-455) based on the meta data (e.g., 441-445) specified for the plurality of data consuming devices (e.g., 451-455).

In one embodiment, the broker engine (405) selectively provides access to data in the at least one data source (e.g., 149) based on the meta data (e.g., 441-445), and measures usage of the data in the at least one data source to generate account receivable information (e.g. 461-465) according to the meta data (e.g., 441-445). In one embodiment, the meta data (e.g., 441-445) indicate that the plurality of data consuming devices (e.g., 451-455) are billed via different models for different data.

In one embodiment, the at least one data source includes a data warehouse (149) storing transaction data (109) and meta data (e.g., 441-445) and a plurality of external data sources (e.g., 421-425), and the computing apparatus further includes: an input engine (403) to interface with the plurality of external data sources (e.g., 421-425); and an intranet (409) to couple the data warehouse (149), the input engine (403), and the broker engine (405). The broker engine (405) is configured to provide a uniform interface to access data in the at least one data source (e.g., 149 and 421-425); and the plurality of external data sources (e.g., 421-425) and the data consuming devices (e.g., 451-455) are external to the intranet (409).

In one embodiment, the input engine (403) and/or the broker engine (405) are implemented using a data processing system as shown in FIG. 7.

In one embodiment, a computing apparatus or system includes the transaction handler (103), the data warehouse (149), a gateway, an offer selector, and/or the profile generator (121).

Data Services

Figure 16:
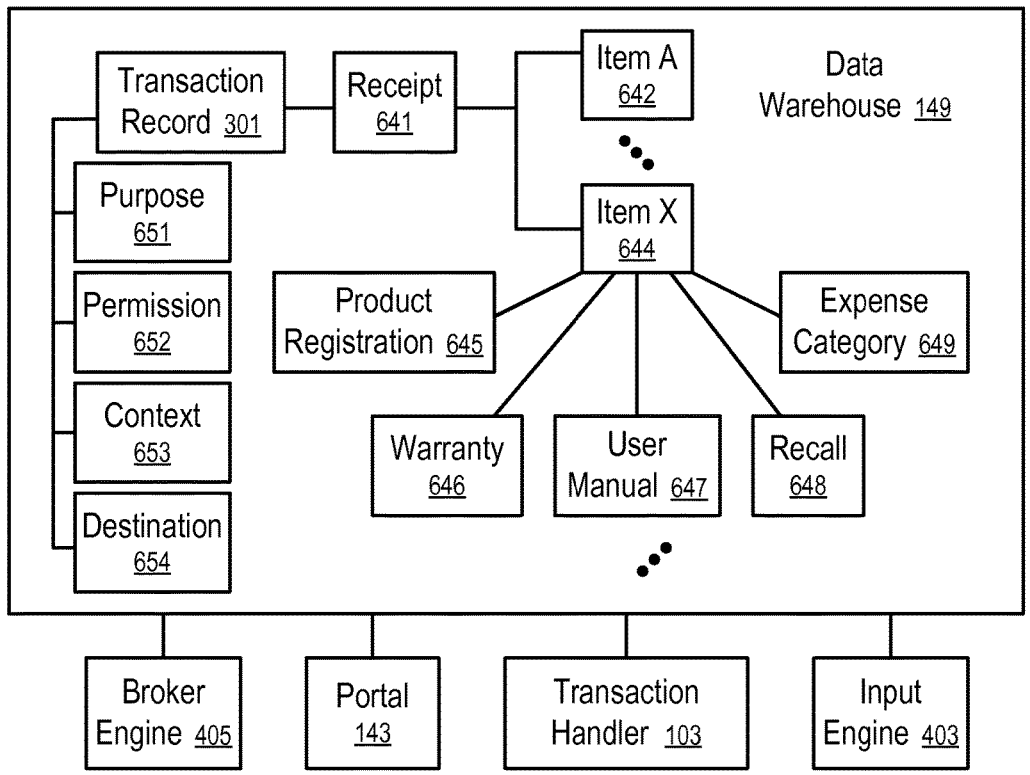
FIG. 16 shows a system to configure transaction related data for services according to one embodiment.

FIG. 16 shows a system to configure transaction related data for services according to one embodiment.

In one embodiment, the data warehouse (149) of the transaction handler (103) is configured to store not only the transaction records (301) resulting from authorization and/or settlement of financial transactions, but also the purchase details (169) and other information related to the purchases, such as receipt (641), identification of items purchased (642, . . . , 644), product registration information (645), product warranty (646), user manual (647), recall information (648), user categorization of expenses/purchases (649), purchase location and timing, etc. The transaction data (109) and the non-transaction data (e.g., 641, . . . , 649) associated with the transaction data (109) are stored in the warehouse (149) to allow the transaction handler (103) to provide enhanced services to customers, merchants, manufactures, issuers, acquirers, and others.

Examples of managing SKU level purchase data, receipts, warranty info, etc. for account holders in one embodiment are provided in U.S. Pat. App. Pub. No. 2011/0093324, published on Apr. 21, 2011 and entitled "Systems and Methods to Provide Intelligent Analytics to Cardholders and Merchants," the disclosure of which is incorporated herein by reference.

Examples of obtaining SKU data via an on-demand request made in an authorization response in one embodiment are provided in U.S. patent application Ser. No. 13/113,710, filed on May 23, 2011 and entitled "Systems and Methods for Redemption of Offers," the disclosure of which is incorporated herein by reference.

In one embodiment, the transaction handler (103) is configured to trigger various actions in response to receiving the authorization request (168) from the merchant. Examples of actions including emailing receipts (641) to the user (101), providing offers (e.g., user specific advertisement data (119)) related to add-on purchases from the same merchant or from other merchants or manufactures, providing rewards and loyalty information (e.g., loyalty record (187)), etc.

Examples of using data stored in the data warehouse (149) to facilitate real-time notification related to offer redemption in one embodiment are provided in U.S. patent application Ser. No. 13/152,186, filed on Jun. 2, 2011 and entitled "Systems and Methods to Provide Messages in Real-Time with Transaction Processing," the disclosure of which is incorporated herein by reference.

Examples of using data stored in the data warehouse (149) to facilitate the delivery of a user profile to assist targeting advertisements in one embodiment are provided in U.S. Pat. App. Pub. No. 2011/0035280, published on Feb. 10, 2011 and entitled "Systems and Methods for Targeted Advertisement Delivery," the disclosure of which is incorporated herein by reference.

In one embodiment, the transaction handler (103) is configured to store for the user (101) the data (e.g., 301, 641, . . . , 649) related to the transaction "in the cloud," such as the data warehouse (149) that is accessible to the user (101) via the portal (143)). Thus, the user (101) has a centralized location to store and manage data related to transactions. In one embodiment, the user (101) can upload at least part of the data (e.g., 641, . . . , or 649) that is stored in association with the transaction record (301) in a way as illustrated in FIG. 16.

In one embodiment, the cloud-based storage of data is personalized with privacy protection and a data expiration policy designed based on the useful life of the data (e.g., 301, 641, . . . , 649) and relevant laws. In one embodiment, the data (e.g., 301, 641, . . . , 649) stored in the data warehouse (149) on behalf of the user (101) of the consumer account (146) includes transaction records (301), purchase details (169), spending scores derived from the transactions (e.g., factor values (345) of the aggregated spending profile (341) of one or more accounts (e.g., 146) of the user (101)), and information related to the purchased items, such as manuals (647), software patches, documentation, warranties (646), user ratings, comments, recommendations, postings, links to interest groups, wish lists of the user (101), etc.

In one embodiment, the data (e.g., 301, 641, . . . , 649) stored in the data warehouse (149) on behalf of the user (101) is tagged with personalization data (e.g., 651, . . . , 654) identifying intended purposes (651), permissions (652), context (653), participants, destinations (654), etc. to allow the user (101) to control the data access, to view how the data has been accessed, and to allow the generation of intelligence information on who is interested in what data, how the data is accessed and in what context, etc.

In one embodiment, the data (e.g., 301, 641, . . . , 649) are configured to be tagged in a hierarchical way to allow a high level tag to serve as default personalization for lower level data, and to allow lower level data to be optionally tagged in ways different from the high level data. For example, in one embodiment, the account level tags provide default personalization for transaction records within the account (146); and transaction record level tags provide default personalization for information related to items purchased via the transaction recorded by the transaction record (301). In one embodiment, a particular data (e.g., 301, 641, . . . , 649) can have its own tag to overwrite higher level tags, if there are any. Thus, the data warehouse (149) can tag the data (e.g., 301, 641, . . . , 649) in a hierarchical way, in response to input from the user (101), to reduce data storage requirements for the data tagging without limiting the flexibility in tagging data items. The hierarchical tagging system also minimizes the user input in personalizing the data.

In one embodiment, the transaction handler (103) is configured to provide a user interface via the portal (143) for the account holders (e.g., user (101)) to interact with the data. For example, the user (101) may type in information, such as purchase details (169), purchase categories (e.g., 649) of items identified by the purchase details (169), SKU or UPC number of the purchased items, comments/recommendations for friends, etc. The user interface is configured to be provided via various communication channels, such as web portals, mobile applications, social network applications, etc.

For example, in one embodiment, after the user (101) scans a receipt (641) or takes a photo image of the receipt (641), the web portal or mobile application of the transaction handler (103) provides a user interface to allow the user (101) to submit the user-created electronic version of receipt (641) for storage in the data warehouse (149) in connection with the respective transaction record (301).

In one embodiment, a server (e.g., the portal (143), or a different server) coupled with the transaction handler (103) and/or the data warehouse (149) is configured to perform optical character recognition (OCR) to identify the content of the user-created electronic version of receipt (641) to generate some of the data (e.g., 642, . . . , 644) in an automated way without further user input, or with user input to correct errors, if there are any.

For example, in one embodiment, a mobile application (or an audio portal) is configured to process voice input from the user (101) for receiving purchase details (169), comments, recommendations, ratings, etc. for the items purchased via the payment transaction processed by the transaction handler (103).

In one embodiment, the transaction handler (103) is configured to provide an application programming interface (API) or web service to communicate with network partners, such as manufacturers, merchants, acquirers, issuers, etc. For example, in one embodiment, the API is used to obtain purchase details (169) from the merchants/acquirers, to obtain product related information from manufacturers (e.g., user manual (646), updates/service patches, recall information (648), coupon offers), to obtain loyalty information from issuers, etc.

In one embodiment, the server, portal (143), mobile application, API and/or web service is configured to automatically get the product information, such as user manual (647) or warranty data (646), from the manufacturers (or from other data sources, such as search engines) (e.g., via the input engine (403)).

Examples of using meta data to integrate internal and external data sources and track data usage for billing/paying according to one embodiment are provided in U.S. patent application Ser. No. 13/093,618, filed Apr. 25, 2011 and entitled "Systems and Methods to Provide Data Services," the disclosure of which is incorporated herein by reference.

For example, in one embodiment, in response to the purchase details (169) from the user (101) and/or from the merchant, the transaction handler (103) or the portal (143) is configured to link the user purchase with user manuals (647) and documentation, complete product registration on behalf of the user (101) using account data (111) associated with the consumer account (146), store registration data (645), and search the internet for information related to the products, such as recalls (648), ratings, comments, recommendations, offers, etc. In one embodiment, the server, portal (143), and/or the mobile application is configured to populate various data items (e.g., 641, . . . 649) in an automated way as defaults; and the user (101) is provided with a user interface to further correct, personalize, adjust, customize, tag the data items (e.g., 641, . . . 649), etc.

In one embodiment, coupons previously stored in the data warehouse (149) for the user (101) of the consumer account (146) are transmitted to the location of purchase (e.g., POS terminal or user mobile phone) for redemption at the time of purchase, or are redeemed automatically via statement credits. In one embodiment, the portal (143) or the advertisement selector (133) is configured to locate new coupons in response to the purchase data (e.g., 169) received from the user (101) or the merchant. The new coupons can be transmitted to the user's mobile phone for retroactive redemption in connection with the current purchase, stored in the user account for the next purchase, or presented via the transaction terminal (105) or the point of interaction (107) (e.g., a mobile phone, a receipt, a statement) to prompt the user (101) to make an additional purchase.

Examples of data stored in the data warehouse (149) to facilitate coupon redemption via statement credit, without user action (other than paying with the card), or downloading the coupon to the transaction terminal or mobile phone in one embodiment, are provided in U.S. Pat. App. Pub. No. 2011/0125565, published on May 26, 2011 and entitled "Systems and Methods for Multi-Channel Offer Redemption," the disclosure of which is incorporated herein by reference.

In one embodiment, the purchase details (169) are used to assist the merchants and/or the manufacturers to manage inventory. For example, the transaction handler (103) may provide the information about the user purchased items, via the portal (143), to the manufacturers and/or the merchants to maintain a desired level of inventory, identify market demands across different geographic areas, and/or manufacture addition items to meet the expected demand.

Examples of using transaction data to support business decisions (such as inventory levels, pricing, etc.) in one embodiment are provided in U.S. Pat. App. Pub. No. 2010/0280881, published on Nov. 4, 2010 and entitled "Demographic Analysis Using Time-Based Consumer Transaction Histories," the disclosure of which is incorporated herein by reference.

Examples of using data stored in the data warehouse (149) to time operational aspects of a merchant, such as consumption of inventory in one embodiment are provided in U.S. patent application Ser. No. 12/940,562, filed Nov. 5, 2010 and entitled "Merchant Timing System and Method" and in U.S. patent application Ser. No. 12/940,664, filed Nov. 5, 2010 and entitled "System and Method for Determining Transaction Distance," the disclosures of which applications are incorporated herein by reference.

In one embodiment, the location of a purchase can be used in social networking applications where other sources of location information, such as mobile phones, may be restricted for reasons of user preferences and/or regulations. The location can also be used to drive location based offers.

Examples of using data stored in the data warehouse (149) with social network check-in applications in one embodiment are provided in U.S. patent application Ser. No. 13/420,541, filed Mar. 14, 2012 and entitled "Systems and Methods to Combine Transaction Terminal Location Data and Social Networking Check-In," the disclosure of which is incorporated herein by reference.

Figure 17:
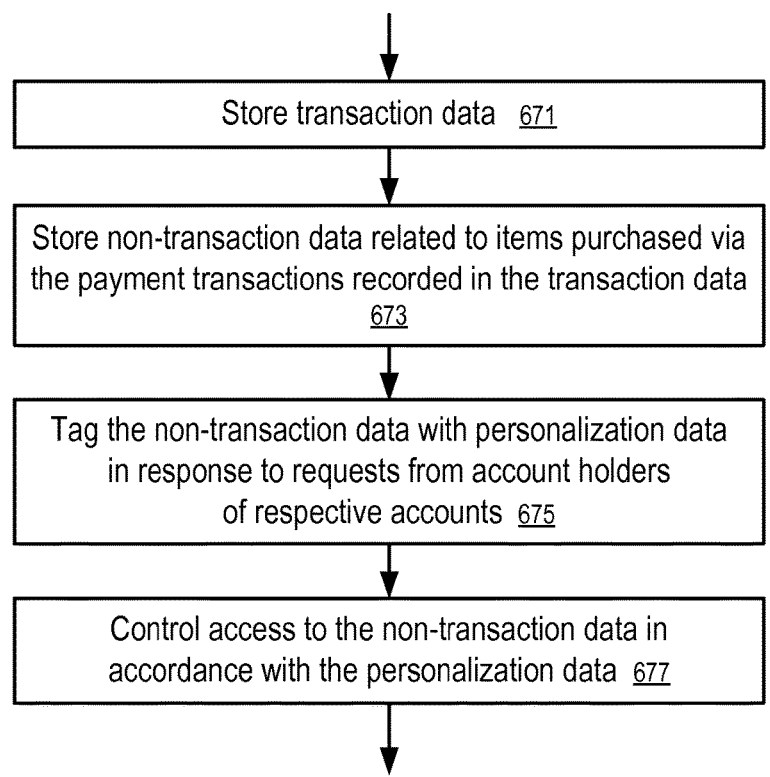
FIG. 17 shows a method to configure transaction related data for services according to one embodiment.

FIG. 17 shows a method to configure transaction related data for services according to one embodiment. In FIG. 17, a computing apparatus is configured to store (671) transaction data (109), store (673) non-transaction data (e.g., 641, . . . , 649) related to items purchased via the payment transactions recorded in the transaction data (e.g., 301), tag (675) the non-transaction data (e.g., 641, . . . , 649) with personalization data (e.g., 651, . . . , 654) in response to requests from account holders (e.g., user (101)) of respective accounts (e.g., 146), and control (677) access to the non-transaction data (e.g., 641, . . . , 649) in accordance with the personalization data (e.g., 651, . . . , 654).

In one embodiment, the personalization data (e.g., 651, . . . , 654) includes purpose data (651) identifying a purpose of respective tagged non-transaction data, permission data (652) identifying permitted usages of respective tagged non-transaction data, context data (653) identifying permissible context in which access to respective tagged non-transaction data is granted, and/or destination data (654) identifying entities who are permitted to receive respective tagged non-transaction data.

In one embodiment, the computing apparatus includes at least one of: the transaction handler (103), the portal (143), the input engine (403), the broker engine (405), the profile generator (121), the media controller (115), and the advertisement selector (133).

Privacy

In one embodiment, a consumer oriented service is provided to communicate to businesses, merchants and/or other entities the privacy preferences of users (101) based on "personal privacy policies" of the respective users (101). The privacy preference communication informs the merchant in specific detail what the user (101) intends to happen with any of the residual data being created by any of the direct or indirect interaction between the user (101) and the merchant.

In one embodiment, a transaction message is provided as a delivery method of the privacy preference communication. The privacy preference communication can be provided in connection with a payment transaction between the user (101) and the merchant, initiated using account information (142) identifying the consumer account (146) of the user (101). The privacy preference communication may occur during the authorization of the transaction, during the settlement of the transaction, or after the settlement of the transaction (e.g., during the communication of the purchase details of a transaction). The privacy preference communication may also be implemented as a notification service separate from the messaging system for the processing of the transactions between merchants and users (101).

In one embodiment, an operating entity performing the notification of the privacy preferences to the merchants is considered a privacy trusted agent. An individual user (101) would assign rights to the trusted agent to allow the trusted agent to, in turn, represent the individual's privacy position via the use of a standardized representation of privacy preferences, such as preferences related to opt-in, segmentation, contact, inclusion or exclusion in aggregated or anonymized data samples, data retention, data usage, and various other stated information that would allow an interested party to retain, access, and/or include the individual's profile in a controlled and transparent manner.

In one embodiment, a user interface is provided to serve as a "personal privacy control panel", where individual users (101) are allowed to record their preferences and specific instructions on how the users (101) want their data to be used, the parties (e.g., specified via an explicit list or via types or categories of the parties) the users (101) are comfortable sharing that data with, as well as explicit prohibitions.

In one embodiment, the personal privacy policy of a user (101) is stored in a standardized format record to form the basis of the privacy preference notification service.

A benefit of the service to an individual user (101) includes that the user (101) would have a convenient way to use the service to inform any trading parties where his or her data might be stored and potentially put to residual use beyond the initial interaction in which the data is generated.

For example, when a user (101) interacts with a commercial website, the user (101) may use the privacy preference notification service of the present disclosure to inform the commercial website his/her instructions for the subsequent use of the data generated from the interaction about the user (101). Thus, after the personal privacy policy of the user (101) is deposited with the privacy trusted agent, the user (101) may rely upon the privacy trusted agent to automatically deliver the privacy preferences of the user (101) to the commercial website.

In one embodiment, the automated delivery of the privacy preferences of the user (101) is coupled with a communication between the user (101) and the commercial website, where the privacy trusted agent is on the path for the communication between the user (101) and the commercial website. For example, in one embodiment, the communication relates to the electronic processing of a payment between the user (101) and the commercial website, and the privacy trusted agent may operate one of the components involved in the processing of the payment, such as a transaction handler (103), an acquirer processor (147), an issuer processor (145), etc.

In one embodiment, the personal privacy policy of the user (101) is tied to the account information (142) in the data warehouse (149). In response to a transaction between the consumer account (146) of the user (101) identified by the account information (142) and the merchant account (148) (e.g., a commercial website, a physical retail channel), the portal (143) identifies the merchant involved in the transaction and communicates the privacy preferences of the user (101) to the merchant (e.g., the commercial website, the physical retail channel).

In one embodiment, the computing apparatuses of the merchants and other commercial or public entities are configured to manage the user data (125) in accordance with the privacy preference communications from the privacy trusted agent. Thus, the privacy preference communications provide an efficient and standardized way to capture consumer consent in their interactions between the users and the respective entities and inform the respective computing apparatuses of the privacy preferences of the users (101). The system of privacy preference communications would also reduce the expense and difficulty of staying compliant with privacy regulations.

In one embodiment, a financial transaction processing network is used as a distribution vehicle for the privacy preferences. When coupled with the assured delivery aspects native to the financial transaction processing network, the system provides a robust way to audit such interactions.

Figure 18:
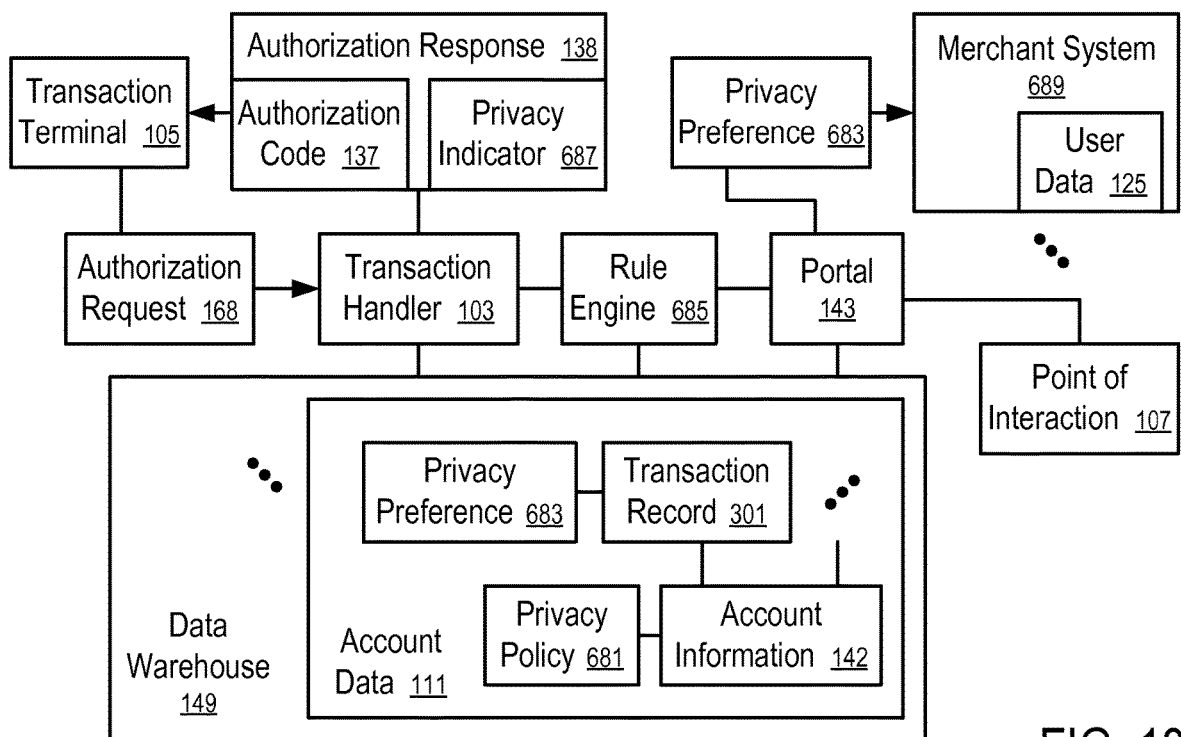
FIG. 18 shows a system to manage data about a user based on privacy preferences of the user according to one embodiment.

FIG. 18 shows a system to manage data about a user (101) based on privacy preferences of the user (101) according to one embodiment. In FIG. 18, the portal (143) is in communication with the point of interaction (107) of a user (101) to provide a user interface configured with a privacy control panel.

In one embodiment, the privacy control panel allows the user (101) to set, codify, review and update the data in the centralized data warehouse (149) to indicate the privacy policy (681) of the user (101). In FIG. 18, a privacy policy (681) of the user (101) is specific for the user (101) corresponding to the account information (142). Different users may customize and personalize the privacy policy (681) in different ways using the privacy control panel.

In one embodiment, the privacy policy (681) is specific to the consumer account (146) identified by the account information (142) and stored as part of the account data (111) for the consumer account (146). The privacy policy (681) controls the data related to activities associated with the consumer account (146). The user (101) may establish different privacy policies (e.g., 681) for different consumer accounts (e.g., 146) issued to the user (101) by the same issuer or different issuers.

In one embodiment, the privacy policy (681) is specific to the user (101) and shared by multiple consumer accounts (e.g., 146) issued to the user (101) by the same issuer or different issuers.

In one embodiment, the privacy control panel allows the user (101) to customize/personalize a privacy template to generate the privacy policy (681) for the user (101) and/or the consumer account (146) identified by the account information (142).

In one embodiment, when a consumer account (146) is issued to multiple users (101) as account holders of the same consumer account (146), the privacy control panel allows the user (101) to customize the privacy policy (681) of the consumer account (146) to generate the privacy policy (681) specifically for the user (101) to control data that relates to the activities of the user (101).

In one embodiment, the privacy control panel allows the user (101) to specify privacy preferences (683) at various granularity levels, based on the identification of individual transactions, groups of transactions, segmentation results, merchants, merchant categories, profile parameters, data usage patterns, etc. The policies/preferences can be specified at household level, cardholder level, account level, subaccount level, transaction timing, transaction location, etc. The privacy preferences (683) can be specified for past transactions that have been recorded in the data warehouse (149), and/or future transactions based on characteristics of transactions.

In one embodiment, the privacy control panel allows the user (101) to identify what data the policies/preferences are applicable to, the admissible destinations of certain data, the prohibited destinations of certain data, the allowable ways to use certain data, the prohibited ways to use certain data, the time period in which the data can be stored in certain destinations, whether the user (101) permits the communications of certain offers or messages to the user (101), the permitted communication channels, time periods, categories, the preferred communication references to be used to receive the permitted communications, etc.

In one embodiment, a rule engine (685) is coupled with the portal (143) to codify and store the privacy preferences (683) of the user (101) in a machine readable format. In one embodiment, the rule engine (685) is configured to identify specific privacy preferences (683) for one or more individual transactions (e.g., as recorded by the transaction record (301)) with a particular merchant, based on the privacy policy (681) stored in the data warehouse (149).

In one embodiment, the portal (143) is configured as a trusted agent to deliver privacy preferences (683) of the user (101), in accordance with the privacy policy (681) of the user (101) to a business/merchant with whom the user (101) does business. The personal privacy policy (681) is configured for machine-to-machine delivery, transformable and/or pluggable for applications, and localized for destinations.

For example, in FIG. 18, the portal (143) is configured to deliver the privacy preference (683) to a merchant system (689) to control the privacy aspects of the user data (125) collected about the user (101) by the merchant system (689).

In one embodiment, the privacy preference (683) controls not only the user data (125) about the transaction (e.g., as identified by the transaction record (301)), but also controls the user data (125) about the user interaction with the merchant system (689) for the transaction, such as the activities of a web browsing session that leads to the purchase that is paid via the transaction corresponding to the transaction record (301), the activities of a web browsing session that is relevant to or connected with the purchase, etc.

In one embodiment, the privacy preference (683) is transmitted to the merchant system (689) as a response to the processing of the transaction by the transaction handler (103). For example, the privacy preference (683) may be communicated to the merchant system (689) in parallel with the processing of the authorization request (168) for the transaction identified by the transaction record (301), after the authorization of the transaction, during the settlement of the transaction, or after the settlement of the transaction. In one embodiment, privacy preferences (e.g., 683) generated for specific transactions are accumulated for delivery to the merchant system (689) according to a regular, pre-determined schedule (e.g., hourly, daily, weekly, or monthly).

In one embodiment, after receiving the authorization request (168) in the transaction handler (103) for the transaction from the transaction terminal (105) of the merchant, the rule engine (685) determines the privacy preference (683) that is applicable to the transaction corresponding to the transaction record (301), based on the privacy policy (681) associated with the account information (142) identified by the authorization request (168). When there is an applicable privacy preference (683) for the transaction, the transaction handler (103) provides a privacy indicator (687) in the authorization response (138) that includes the authorization code (137) for the transaction.

In one embodiment, the privacy indicator (687) indicates that the data warehouse (149) has the privacy preference (683) that is applicable to the transaction and that the merchant system (689) is to retrieve the privacy preference (683) from the portal (143) for the transaction.

In one embodiment, the merchant system (689) is configured to download the privacy preference (683) prior to authorizing the transaction. In other embodiments, the merchant system (689) is configured to download the privacy preference (683) during or after the settlement of the transaction, or in accordance with a predetermined time schedule.

In one embodiment, the privacy indicator (687) includes the privacy preference (683), and thus the merchant system (689) does not have to separately download the privacy preference (683) from the portal (143).

In one embodiment, the privacy preference (683) includes the meta data to control the privacy and data access as discussed in the section entitled "DATA INTEGRATION ENGINE". In one embodiment, the privacy preference (683) includes data tags as discussed in the section entitled "DATA SERVICES".

In one embodiment, the privacy policy (681) or the privacy preference (683) of the user (101) is delivered to the computing devices (e.g., merchant system (689)) of the business/merchant in an automated way in response to a transaction between the user (101) and the business/merchant.

In one embodiment, the privacy preference (683) is generated by the rule engine (685) based on the privacy policy (681) specifically for the respective transaction. The merchant system (689) is configured to manage the user data (125) related to the transaction based on the privacy preference (683) without the need to derive the specific privacy preferences (683) for the user data (125) from the generic privacy policy (681), which may include preferences that are not applicable to the user data (125).

In one embodiment, the merchant system (689) is configured with the capability of deriving specific privacy preferences (683) for a transaction from the generic privacy policy (681). In response to a transaction, the portal determines whether the current version of the privacy policy (681) has been delivered to the merchant system (689), and if not, the portal (143) is configured to deliver the generic privacy policy (681) of the user (101) to the merchant system (689). For example, if the user (101) recently updated the privacy policy (681) using the privacy control panel, the transaction handler (103) may provide the privacy indicator (687) in the authorization response (138) for a transaction made after the updating of the privacy policy (681) to cause the merchant system (689) to retrieve the current version of the privacy policy (681) from the data warehouse (149) via the portal (143).

In one embodiment, the privacy indicator (687) includes an address (e.g., a universal resource locator/uniform resource locator (URL)) that specifies a location on the portal (143), from which the merchant system (689) can download the privacy preference (683) for the user data (125) related to the transaction of the authorization response (138) (or the privacy policy (681) of the user (101) of the consumer account (146) involved in the authorization response (138)).

In one embodiment, the privacy indicator (687) includes at least part of the privacy preferences (683) or the privacy policy (681).

In one embodiment, the delivery of the privacy policy (681) of the user (101) or the privacy preferences (683) for a transaction is configured to occur during the authorization process (e.g., in parallel with the authorization response (138), or before the transaction terminal (105) authorizes the transaction in view of the authorization code (137)).

In one embodiment, the delivery of the privacy policy (681) of the user (101) or the privacy preferences (683) for a transaction is configured to occur during the settlement process of the transaction (e.g., in parallel with settlement communications amount the transaction handler (103), the issuer processor (145) and the acquirer processor (147)).

In one embodiment, the delivery of the privacy policy (681) of the user (101) or the privacy preferences (683) for a transaction is configured to occur according to a predetermined time schedule for settled or authorized transactions. For example, in one embodiment, at a scheduled time instance, the portal (143) and/or the rule engine (685) is configured to check the transaction data (109), such as the transaction record (301) of an authorized transaction or a settled transaction between the user (101) and the merchant, to determine whether or not to communicate with or transmit the privacy preference (683) or the privacy policy (681) to the merchant system (689) of the respective merchant.

In one embodiment, the determination of whether to deliver the privacy preference (683) for a transaction is based at least in part on the identity of the merchant, whether the privacy preference (683) has already been delivered for the transaction, whether the privacy policy (681) of the user (101) has been changed since the previous delivery of the privacy preference (683), whether the change of the privacy policy (681) of the user (101) is applicable to the transaction, and/or whether the merchant system (689) has the capability of deriving privacy preference (683) for the transaction from the privacy policy (681) of the user (101).

In one embodiment, the determination of whether to deliver the privacy policy (681) is based on the identity of the merchant, whether the merchant system (689) has the capability of deriving the privacy preference (683) for the transaction from the privacy policy (681) of the user (101), and if so, whether the privacy policy (681) of the user (101) has been changed since the previous delivery of the privacy policy (681) to the merchant system (689).

In one embodiment, the delivery of the privacy policy (681) of the user (101) or the privacy preferences (683) for a transaction is configured to occur during the communication session for the transmission of the purchase details (169) from the merchant system (689) to the data warehouse (149), as discussed in connection with FIG. 9 in the section entitled "PURCHASE DETAILS".

In one embodiment, the delivery of the privacy policy (681) of the user (101) or the privacy preferences (683) for a transaction is performed by the portal (143) via a notification service separate from the communications for the processing of the authorization and settlement of transactions. In one embodiment, the notification service is performed based on a periodic schedule and the transaction data (109), or triggered by the authorization and/or settlement of the transaction by the transaction handler (103), the issuer processor (145), or the acquirer processor (147).

In one embodiment, the data warehouse (149) provides a centralized repository for the privacy policies (e.g., 681) and privacy preferences (e.g., 683) of the users (e.g., 101). In one embodiment, for a business/merchant with whom the user (101) does business, a specific privacy policy (681) (e.g., privacy preferences (683)) is generated from the generic privacy policy (681) of the user (101) and delivery to the business/merchant to instruct the business/merchant on how to handle the data related to the user (101) from privacy protection point of view.

In one embodiment, the delivery of the privacy policy (681) or the privacy preference (683) of a user (101) are triggered by the payment transactions between the user (101) and the respective merchants involved in the payment transactions.

In one embodiment, the privacy policy (681) of the user (101) includes one or more of: opt-in preferences (e.g., whether or not the user (101) wants to enroll in a particular program or a particular type of programs), opt-out preferences (e.g., whether or not the user (101) wants to opt out of a particular program or a particular type of programs), reenrollment preferences (e.g., whether or not the user (101) wants to be reenrolled in a particular program or a particular type of programs, after the expiration of a predetermined enrollment period, conditions for automated reenrollment), segment preferences (e.g., whether or not the user (101) wants to be included in a segment of users classified by transaction patterns), contact preferences (e.g., whether or not the user (101) wants to be contacted for a type of communications, a communication reference used to receive specific types of communications), preferences for inclusion or exclusion in data samples (e.g., whether or not the user (101) wants to be included or excluded in a certain type of statistical analyses, where the user (101) is anonymized in the analysis such that the analysis result cannot be traced back to the user (101)), preferences on data retention (e.g., types of data about the user (101) that is permitted by the user (101) to be stored in the merchant systems (e.g., 689), a time period set for the expiration of the stored data about the user (101) after which the data should be removed from the merchant systems (e.g., 689), types of merchant systems (e.g., 689) that are permitted to store the data about the user (101) after the time period necessary for the current business interaction), preferences on being targeted for offers (e.g., whether or not the user (101) wants to be contacted for certain types of offers, by certain types of merchants/ businesses, conditions for the user (101) to be contacted for the offers), preferences on different types of data (e.g., locations/regions, purchase details, transaction categories), different preferences for the short term use of the data about the user (101) (e.g., during the life time of a transaction, during a particular communication session, during a day, a week or a month) and the long term use of the data (e.g., after a few months or years of the collection of the data, after the expiration of the time period that is a few times longer than the life time of a transaction, or that is longer than a warranty period associated with the transaction).

For example, in one embodiment, the privacy policy (681) allows the user (101) to specify privacy preferences (683) such as "share my first name, a virtual personal account number, my zip code, but not my street address or last name." The privacy policy (681) may be stored in plain text, XML, digital certificate, etc., and communicated to the merchant system (689) via HTTP, SMS, email, etc.

In one embodiment, the privacy control panel includes graphical user interfaces, such as slides, drop-down options, radio buttons, etc., to receive user input to define the privacy policy (681). In one embodiment, the privacy policies (681) are specified for different categories of products or services, such as photography, electronics, etc. In one embodiment, the privacy policies (681) can be specified for specific businesses/merchants and/or for specific transactions.

In one embodiment, after the privacy preference (683) or the privacy policy (681) is provided to the merchant system (689) as a result of a transaction between the user (101) and the respective merchant, the privacy preferences (683) or the privacy policy (681) is used to manage the storage and usage of the user data (125) for any subsequent transactions between the user (101) and the merchant, until the user (101) modifies the privacy policy (681) via the privacy control panel.

In one embodiment, when the transaction handler (103) or the portal (143) predicts that the user (101) is going to do business with the merchant system (689), the portal (143) is configured to proactively transmit the privacy preference (683) or the privacy policy (681) to the merchant system (689) to protect the privacy of the user (101).

In one embodiment, if the user (101) forgot to, or would like to, modify the privacy preferences (683) provided in response to the prior transaction, after the completion of the current transaction, the portal (143) is configured to allow the user (101) to retroactively modify the prior privacy preference (683) for the current transaction.

Figure 19:
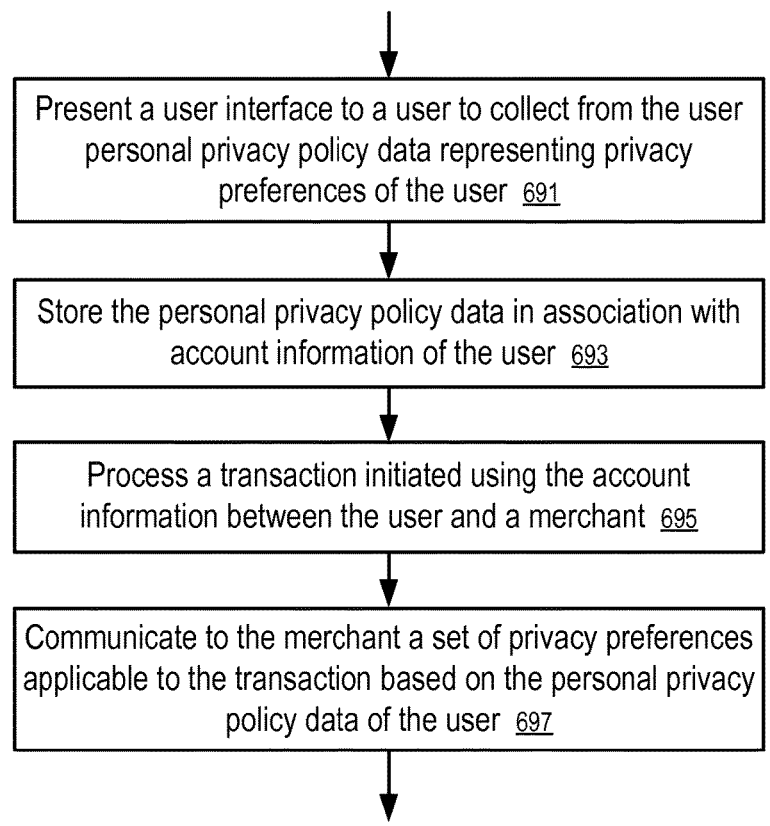
FIG. 19 shows a method to distribute privacy preferences according to one embodiment.

FIG. 19 shows a method to distribute privacy preferences (683) according to one embodiment. In FIG. 19, a computing apparatus is configured to present (691) a user interface to a user (101) to collect from the user (101) personal privacy policy data (e.g., 681) representing privacy preferences (e.g., 683) of the user (101), store (693) the personal privacy policy data (e.g., 681) in association with account information (142) of the user (101), process (695) a transaction initiated using the account information (142) between the user (101) and a merchant, and communicate (697) to the merchant a set of privacy preferences (683) applicable to the transaction based on the personal privacy policy data (e.g., 681) of the user (101).

Figure 20:
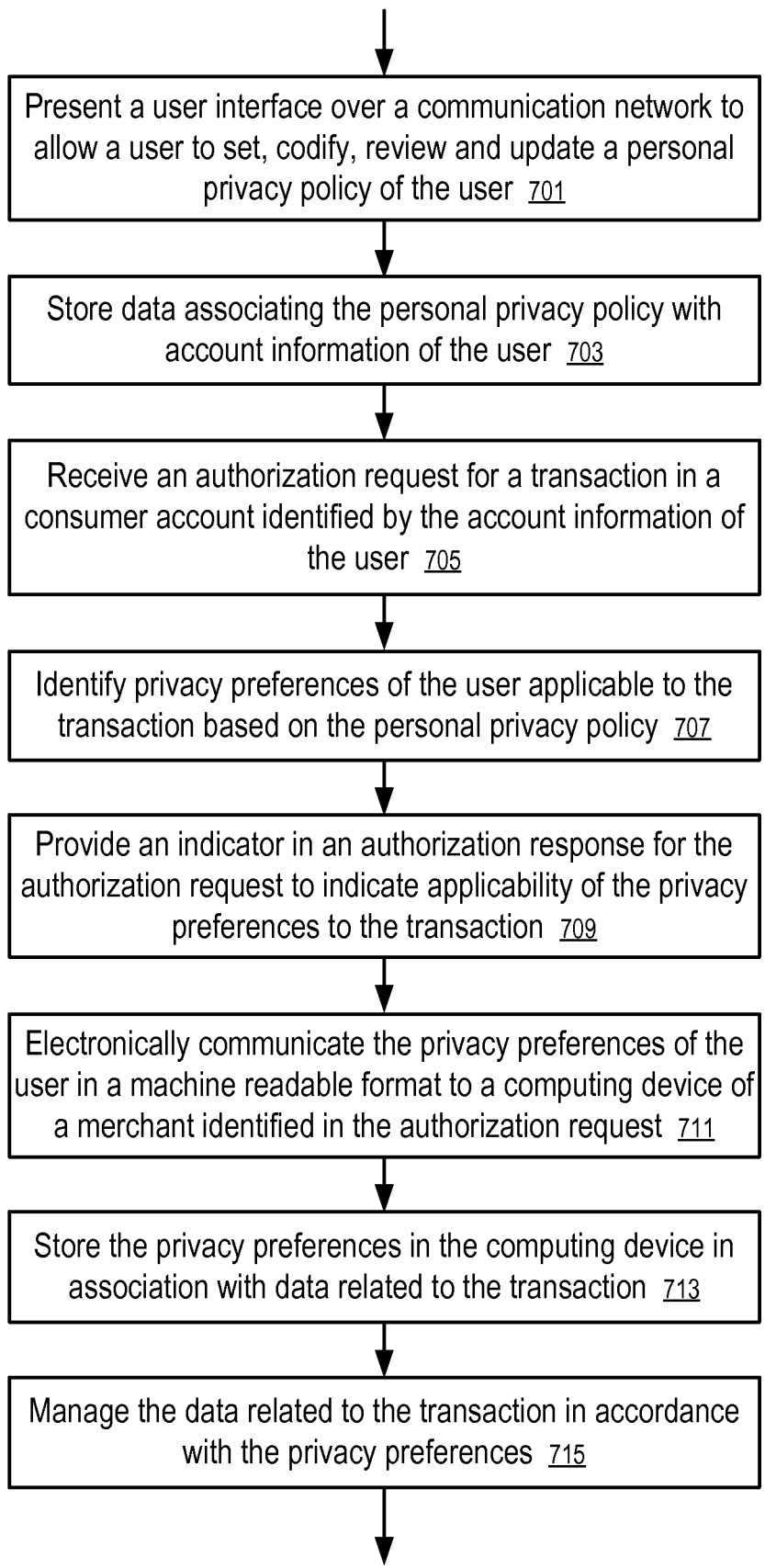
FIG. 20 shows a method to manage data according to one embodiment.

FIG. 20 shows a method to manage data according to one embodiment. In FIG. 20, the computing apparatus is configured to present (701) a user interface over a communication network (e.g., internet) to allow a user (101) to set, codify, review and update a personal privacy policy (681) of the user (101); store (703) data associating the personal privacy policy (681) with account information (142) of the user (101); receive (705) an authorization request (168) for a transaction in a consumer account (146) identified by the account information (142) of the user (101); identify (707) privacy preferences (683) of the user (101) applicable to the transaction based on the personal privacy policy (681); provide (709) a privacy indicator (687) in an authorization response (138) for the authorization request (168) to indicate applicability of the privacy preferences (683) to the transaction; and electronically communicate (711) the privacy preferences (683) of the user (101) in a machine readable format to a computing device (e.g., 689) of a merchant identified in the authorization request (168). The computing device (e.g., 689) of a merchant is configured to store (713) the privacy preferences (683) in the computing device (e.g., 689) in association with the user data (125) related to the transaction, and manage (715) the user data (125) related to the transaction in accordance with the privacy preferences (683).

In one embodiment, the computing apparatus includes at least one of: the transaction handler (103), the rule engine (685), the portal (143), the data warehouse (149), the point of interaction (107), the merchant system (689) and the transaction terminal (105).

In one embodiment, the delivery of the privacy preference (683) is triggered by the payment transaction processed by the transaction handler (103), the issuer processor (145), the acquirer processor (147). Alternatively, the delivery of the privacy preference (683) is triggered by other interactions between the user (101) and the business, merchant or entity, such as authenticating the user (101) for using the service of the entity, providing a check-out service for an online purchase, processing a payment using a digital wallet of the user, providing a web content for embedding a web page of the entity, providing a search result for display in a web page of the entity, etc.

Some details about the system in one embodiment are provided in the sections entitled "SYSTEM", "CENTRALIZED DATA WAREHOUSE" and "HARDWARE".

Variations

Some embodiments use more or fewer components than those illustrated in FIGS. 1 and 4-7. For example, in one embodiment, the user specific profile (131) is used by a search engine to prioritize search results. In one embodiment, the correlator (117) is to correlate transactions with online activities, such as searching, web browsing, and social networking, instead of or in addition to the user specific advertisement data (119). In one embodiment, the correlator (117) is to correlate transactions and/or spending patterns with news announcements, market changes, events, natural disasters, etc. In one embodiment, the data to be correlated by the correlator with the transaction data (109) may not be personalized via the user specific profile (131) and may not be user specific. In one embodiment, multiple different devices are used at the point of interaction (107) for interaction with the user (101); and some of the devices may not be capable of receiving input from the user (101). In one embodiment, there are transaction terminals (105) to initiate transactions for a plurality of users (101) with a plurality of different merchants. In one embodiment, the account information (142) is provided to the transaction terminal (105) directly (e.g., via phone or Internet) without the use of the account identification device (141).

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

For example, in one embodiment, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, in one embodiment, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the entity operating the transaction handler (103) provides the intelligence information in real-time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010 and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In one embodiment, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

In one embodiment, a "card-present" transaction involves physically presenting the account identification device (141), such as a financial transaction card, to the merchant (e.g., via swiping a credit card at a POS terminal of a merchant); and a "card-not-present" transaction involves presenting the account information (142) of the consumer account (146) to the merchant to identify the consumer account (146) without physically presenting the account identification device (141) to the merchant or the transaction terminal (105).

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID (305) recorded for the transaction.

In one embodiment, the transaction records (301) may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records (301), the spending patterns reflected in the transaction records (301) can be difficult to recognize by an ordinary person.

In one embodiment, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAICS) code, or a similarly standardized category code). In other embodiments, an area may be identified by a product category, a SKU number, etc.

In one embodiment, a variable of a same category (e.g., frequency (313) or amount (315)) is defined to be aggregated over a set of mutually exclusive areas. A transaction is classified in only one of the mutually exclusive areas. For example, in one embodiment, the spending frequency variables (313) are defined for a set of mutually exclusive merchants or merchant categories. Transactions falling with the same category are aggregated.

Examples of the spending frequency variables (313) and spending amount variables (315) defined for various merchant categories (e.g., 306) in one embodiment are provided in U.S. patent application Ser. No. 12/537,566, filed Aug. 7, 2009 and entitled "Cardholder Clusters," the disclosure of which application is hereby incorporated herein by reference.

In one embodiment, super categories (311) are defined to group the categories (e.g., 306) used in transaction records (301). The super categories (311) can be mutually exclusive. For example, each merchant category (306) is classified under only one super merchant category but not any other super merchant categories. Since the generation of the list of super categories typically requires deep domain knowledge about the businesses of the merchants in various categories, super categories (311) are not used in one embodiment.

In one embodiment, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

In one embodiment, the transaction records (301) are aggregated according to a buying entity. The aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular account (e.g., presented by the account number (302)) can be aggregated for an account level analysis. To aggregate the transaction records (301) in account level, the transactions with a specific merchant or merchants in a specific category are counted according to the variable definitions (309) for a particular account to generate a frequency measure (e.g., 313) for the account relative to the specific merchant or merchant category; and the transaction amounts (e.g., 304) with the specific merchant or the specific category of merchants are summed for the particular account to generate an average spending amount for the account relative to the specific merchant or merchant category. For example, the transaction records (301) for a particular person having multiple accounts can be aggregated for a person level analysis, the transaction records (301) aggregated for a particular family for a family level analysis, and the transaction records (301) for a particular business aggregated for a business level analysis.

The aggregation (317) can be performed for a predetermined time period, such as for the transactions occurring in the past month, in the past three months, in the past twelve months, etc.

In another embodiment, the transaction records (301) are aggregated according to a selling entity. The spending patterns at the selling entity across various buyers, products or services can be analyzed. For example, the transaction records (301) for a particular merchant having transactions with multiple accounts can be aggregated for a merchant level analysis. For example, the transaction records (301) for a particular merchant group can be aggregated for a merchant group level analysis.

In one embodiment, the aggregation (317) is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

For example, a cluster analysis (329) can identify a set of clusters and thus cluster definitions (333) (e.g., the locations of the centroids of the clusters). In one embodiment, each entity ID (322) is represented as a point in a mathematical space defined by the set of variables; and the variable values (323, 324, . . . , 325) of the entity ID (322) determine the coordinates of the point in the space and thus the location of the point in the space. Various points may be concentrated in various regions; and the cluster analysis (329) is configured to formulate the positioning of the points to drive the clustering of the points. In other embodiments, the cluster analysis (329) can also be performed using the techniques of Self Organizing Maps (SOM), which can identify and show clusters of multi-dimensional data using a representation on a two-dimensional map.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

Similarities and differences among the entities, such as accounts, individuals, families, etc., as represented by the entity ID (e.g., 322) and characterized by the variable values (e.g., 323, 324, . . . , 325) can be identified via the cluster analysis (329). In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions (333) is generated from cluster analyses (329). For example, cluster analyses (329) may generate different sets of cluster solutions corresponding to different numbers of identified clusters. A set of cluster IDs (e.g., 343) can be used to summarize (335) the spending behavior of the entity represented by the entity ID (322), based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions (333), such as the parameters (e.g., variable values) that define the centroids of the clusters.

In one embodiment, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In one embodiment, a factor analysis (327) is performed to reduce the redundancy and/or correlation among the variables (e.g., 313, 315). The factor analysis (327) identifies the definitions (331) for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In one embodiment, the diversity index (342) may include an entropy value and/or a Gini coefficient, to represent the diversity of the spending by the entity represented by the entity ID (322) across different areas (e.g., different merchant categories (e.g., 306)). When the diversity index (342) indicates that the diversity of the spending data is under a predetermined threshold level, the variable values (e.g., 323, 324, . . . , 325) for the corresponding entity ID (322) may be excluded from the cluster analysis (329) and/or the factor analysis (327) due to the lack of diversity. When the diversity index (342) of the aggregated spending profile (341) is lower than a predetermined threshold, the factor values (344) and the cluster ID (343) may not accurately represent the spending behavior of the corresponding entity.

In one embodiment, the channel distribution (345) includes a set of percentage values that indicate the percentages of amounts spent in different purchase channels, such as online, via phone, in a retail store, etc.

In one embodiment, the category distribution (346) includes a set of percentage values that indicate the percentages of spending amounts in different super categories (311). In one embodiment, thousands of different merchant categories (e.g., 306) are represented by Merchant Category Codes (MCC), or North American Industry Classification System (NAICS) codes in transaction records (301). These merchant categories (e.g., 306) are classified or combined into less than one hundred super categories (or less than twenty). In one example, fourteen super categories are defined based on domain knowledge.

In one embodiment, the aggregated spending profile (341) includes the aggregated measurements (e.g., frequency, average spending amount) determined for a set of predefined, mutually exclusive merchant categories (e.g., super categories (311)). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code (347) in the aggregated spending profile (341) represents the dominant geographic area in which the spending associated with the entity ID (322) occurred. Alternatively or in combination, the aggregated spending profile (341) may include a distribution of transaction amounts over a set of zip codes that account for a majority of the transactions or transaction amounts (e.g., 90%).

In one embodiment, the factor analysis (327) and cluster analysis (329) are used to summarize the spending behavior across various areas, such as different merchants characterized by merchant category (306), different products and/or services, different consumers, etc.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353). For example, when an account number change has occurred for a cardholder in the time period under analysis, the transaction records (301) under the different account numbers of the same cardholder are combined under one account number that represents the cardholder. For example, when the analysis is performed at a person level (or family level, business level, social group level, city level, or region level), the transaction records (301) in different accounts of the person (or family, business, social group, city or region) can be combined under one entity ID (322) that represents the person (or family, business, social group, city or region).

In one embodiment, recurrent/installment transactions are combined (355). For example, multiple monthly payments may be combined and considered as one single purchase.

In FIG. 3, account data are selected (357) according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID (322) is below a threshold, the variable values (e.g., 323, 324, . . . , 325) corresponding to the entity ID (322) are not used in the cluster analysis (329) and/or the factor analysis (327). The diversity can be examined based on the diversity index (342) (e.g., entropy or Gini coefficient), or based on counting the different merchant categories in the transactions associated with the entity ID (322); and when the count of different merchant categories is fewer than a threshold (e.g., 5), the transactions associated with the entity ID (322) are not used in the cluster analysis (329) and/or the factor analysis (327) due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID (322) is below a threshold, the variable values (e.g., 323, 324, . . . , 325) corresponding to the entity ID (322) are not used in the cluster analysis (329) and/or the factor analysis (327).

For example, when a cardholder has only used a credit card during a portion of the time period under analysis, the transaction records (301) during the time period may not reflect the consistent behavior of the cardholder for the entire time period. Consistency can be checked in various ways. In one example, if the total number of transactions during the first and last months of the time period under analysis is zero, the transactions associated with the entity ID (322) are inconsistent in the time period and thus are not used in the cluster analysis (329) and/or the factor analysis (327). Other criteria can be formulated to detect inconsistency in the transactions.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109). For example, factor definitions (331) can be applied to the transactions in the time period under analysis (e.g., the past twelve months) and be applied separately to the transactions in a prior time period (e.g., the twelve months before the past twelve months) to obtain two sets of factor values. The factor definitions (331) can be adjusted to improve the correlation between the two set of factor values.

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

In one embodiment, the clusters and affinity information are standardized to allow sharing between business partners, such as transaction processing organizations, search providers, and marketers. Purchase statistics and search statistics are generally described in different ways. For example, purchase statistics are based on merchants, merchant categories, SKU numbers, product descriptions, etc.; and search statistics are based on search terms. Once the clusters are standardized, the clusters can be used to link purchase information based merchant categories (and/or SKU numbers, product descriptions) with search information based on search terms. Thus, search predilection and purchase predilection can be mapped to each other.

In one embodiment, the purchase data and the search data (or other third party data) are correlated based on mapping to the standardized clusters (cells or segments). The purchase data and the search data (or other third party data) can be used together to provide benefits or offers (e.g., coupons) to consumers. For example, standardized clusters can be used as a marketing tool to provide relevant benefits, including coupons, statement credits, or the like to consumers who are within or are associated with common clusters. For example, a data exchange apparatus may obtain cluster data based on consumer search engine data and actual payment transaction data to identify like groups of individuals who may respond favorably to particular types of benefits, such as coupons and statement credits.

Details about aggregated spending profile (341) in one embodiment are provided in U.S. patent application Ser. No. 12/777,173, filed May 10, 2010 and entitled "Systems and Methods to Summarize Transaction Data," the disclosure of which is hereby incorporated herein by reference.

Transaction Data Based Portal

In FIG. 1, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 4 shows a system to provide information based on transaction data (109) according to one embodiment. In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127) or aggregated spending profile (341). The portal (143) may be implemented as a web portal, a telephone gateway, a file/data server, etc.

In one embodiment, the portal (143) is configured to receive queries identifying search criteria from the profile selector (129), the advertisement selector (133) and/or third parties and in response, to provide transaction-based intelligence requested by the queries.

In one embodiment, the portal (143) is to register the interest of users (101), or to obtain permissions from the users (101) to gather further information about the users (101), such as data capturing purchase details, online activities, etc.

In one embodiment, the portal (143) is to receive information from third parties, such as search engines, merchants, websites, etc. The third party data can be correlated with the transaction data (109) to identify the relationships between purchases and other events, such as searches, news announcements, conferences, meetings, etc., and improve the prediction capability and accuracy.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records (301) or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction handler (103) is coupled to the portal (143) (and/or the profile selector (129), the advertisement selector (133), the media controller (115)) to charge the fees for the services of providing the transaction-based intelligence information and/or advertisement.

For example, in one embodiment, the system illustrated in FIG. 1 is configured to deliver advertisements to the point of interaction (107) of the user (101), based on the transaction-based intelligence information; and the transaction handler (103) is configured to charge the advertisement fees to the account of the advertiser in communication with the issuer processor in control of the account of the advertiser. The advertisement fees may be charged in response to the presentation of the advertisement, or in response to the completion of a pre-determined number of presentations, or in response to a transaction resulted from the presentation of the advertisement. In one embodiment, the transaction handler (103) is configured to a periodic fee (e.g., monthly fee, annual fee) to the account of the advertiser in communication with the respective issuer processor that is similar to the issuer processor (145) of the consumer account (146).

For example, in one embodiment, the portal (143) is configured to provide transaction-based intelligence information in response to the queries received in the portal (143). The portal (143) is to identify the requesters (e.g., via an authentication, or the address of the requesters) and instruct the transaction handler (103) to charge the consumer accounts (e.g., 146) of the respective requesters for the transaction-based intelligence information. In one embodiment, the accounts of the requesters are charged in response to the delivery of the intelligence information via the portal (143). In one embodiment, the accounts of the requesters are charged a periodic subscription fee for the access to the query capability of the portal (143).

In one embodiment, the information service provided by the system illustrated in FIG. 1 includes multiple parties, such as one entity operating the transaction handler (103), one entity operating the advertisement data (135), one entity operating the user tracker (113), one entity operating the media controller (115), etc. The transaction handler (103) is used to generate transactions to settle the fees, charges and/or divide revenues using the accounts of the respective parties. In one embodiment, the account information of the parties is stored in the data warehouse (149) coupled to the transaction handler (103). In some embodiments, a separate billing engine is used to generate the transactions to settle the fees, charges and/or divide revenues.

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (146) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," U.S. patent application Ser. No. 12/940,562, filed Nov. 5, 2010, and U.S. patent application Ser. No. 12/940,664, filed Nov. 5, 2010, the disclosures of which applications are hereby incorporated herein by reference.

Transaction Terminal

FIG. 5 illustrates a transaction terminal according to one embodiment. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with, or near, the transaction terminal (105) (e.g., a video monitor or display, a digital sign), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital sign, etc.

In general, a point of interaction (e.g., 107) may or may not be capable of receiving inputs from the customers, and may or may not co-located with a transaction terminal (e.g., 105) that initiates the transactions. The spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 1 and 4, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 1 and 4, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 7, with more or fewer components. Some of the modules may share hardware or be combined on a computer system. In one embodiment, a network of computers can be used to implement one or more of the modules.

Further, the data illustrated in FIG. 1, such as transaction data (109), account data (111), transaction profiles (127), and advertisement data (135), can be stored in storage devices of one or more computers accessible to the corresponding modules illustrated in FIG. 1. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The description and drawings are illustrative and are not to be construed as limiting. The present disclosure is illustrative of inventive features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A computing system, comprising:
a personal computing device of a user communicating with a portal over a communication network;
the portal communicating with the personal computing device of the user over the communication network, communicating with a computing system of a merchant over the communication network, coupled to a data warehouse, and coupled to a rule engine, the portal controlling communication of the data warehouse and the rule engine with the personal computing device and the computing system of the merchant;
wherein the portal provides a user interface over the communication network to the personal computing device of the user;
wherein the portal receives, from the user interface provided to the personal computing device, a privacy policy of the user;
wherein the data warehouse stores the privacy policy in connection with account information identifying a payment account of the user;
wherein a transaction handler is coupled with the data warehouse, wherein the transaction handler receives, over a payment processing network from a point of sales terminal of the computing system of the merchant, an authorization request for a payment transaction initiated by the point of sales terminal in the payment account using the account information;

wherein, in response to the authorization request, the rule engine, coupled with the transaction handler and the data warehouse, determines a set of privacy preferences based on the privacy policy of the user stored in the data warehouse;

wherein, in response to the determination of the set of privacy preferences, the transaction handler inserts a privacy indicator in an authorization response, wherein the privacy indicator includes the set of privacy preferences, and wherein the transaction handler transmits the authorization response for the payment transaction to the point of sales terminal over the payment processing network; and wherein, in response to receiving the privacy indicator including the set of privacy preferences in the authorization response, the computing system of the merchant removes user data relevant to the payment transaction from the computing system of the merchant after a time period of the payment transaction based on the set of privacy preferences.

2. The computing system of claim 1, wherein the user data includes data about activities of the user on the computing system of the merchant in connection with the payment transaction.

3. The computing system of claim 2, wherein the set of privacy preferences received by the computing system of the merchant further configures the computing system of the merchant in targeting the user for offers.

4. The computing system of claim 2, wherein the set of privacy preferences received by the computing system of the merchant further configures the computing system of the merchant to exclude the user data from data samples.

5. The computing system of claim 2, wherein the set of privacy preferences received by the computing system of the merchant further configures the computing system in contacting the user.

6. The computing system of claim 1, wherein the user interface is configured to allow the user to specify the privacy policy at a plurality of granularity levels based on transaction groups, merchant groups, data usage patterns, transaction timing, and transaction location.

7. The computing system of claim 1, wherein the privacy indicator further comprises an address that specifies a location on the portal from which the computing system of the merchant can download the set of privacy preferences.

8. The computer system of claim 1, wherein the personal computing device comprises one of a mobile phone, a personal digital assistant, or a personal computer.

9. A computer-implemented method, comprising:
providing a computing system comprising:
a personal computing device of a user communicating with a portal over a communication network;
a portal communicating with the personal computing device of the user over the communication network, communicating with a computing system of a merchant over the communication network, coupled to a data warehouse, and coupled to a rule engine, the portal controlling communication of the data warehouse and the rule engine with the personal computing device and the computing system of the merchant;

providing, by the portal, a user interface over the communication network to the personal computing device of the user;

receiving, by the portal from the user interface provided to the personal computing device, a privacy policy of the user;

storing, by the data warehouse the privacy policy in association with account information identifying a payment account of the user;

receiving, by a transaction handler over a payment processing network from a point of sales terminal of the computing system of the merchant, an authorization request for a payment transaction initiated by the point of sales terminal in the payment account using the account information, wherein the transaction handler is coupled to the data warehouse;

in response to the authorization request determining, by the rule engine coupled with the transaction handler and the data warehouse, a set of privacy preferences based on the privacy policy of the user stored in the data warehouse;

in response to the determination of the set of privacy preferences, inserting, by the transaction handler, a privacy indicator in an authorization response, wherein the privacy indicator includes the set of privacy preferences, and transmitting, by the transaction handler over the payment processing network, the authorization response for the payment transaction to the point of sales terminal; and in response to receiving the privacy indicator including the set of privacy preferences in the authorization response, removing, by the computing system of the merchant, user data relevant to the payment transaction from the computing system of the merchant after a time period of the payment transaction based on the set of privacy preferences.

10. The method of claim 9, the determining further comprising:
deriving, by the rule engine, the set of privacy preferences for the payment transaction based on the privacy policy.

11. The method of claim 10, further comprising:
storing the set of privacy preferences; and
managing storage and usage of user data associated with the payment transaction according to the set of privacy preferences.

12. The method of claim 9, wherein the privacy indicator further comprises an address that specifies a location on the portal from which the computing system of the merchant can download the set of privacy preferences.

13. The method of claim 9, wherein the personal computing device comprises one of a mobile phone, a personal digital assistant, or a personal computer.

14. At least one non-transitory computer-storage medium storing instructions configured to instruct a computing system to at least:
provide, by a portal, a user interface over a communication network to a personal computing device of a user, wherein the personal computing device of the user communicates with the portal over a communication network, and wherein the portal communicates with the personal computing device of the user over the communication network, communicates with a computing system of a merchant over the communication network, is coupled to a data warehouse, and is coupled to a rule engine, the portal controlling communication of the data warehouse and the rule engine with the personal computing device and the computing system of the merchant;

receive, by the portal from the user interface provided to the personal computing device, a privacy policy of the user;

store, by the data warehouse, the privacy policy in association with account information identifying a payment account of the user;

receive, by a transaction handler over a payment processing network from a point of sales terminal of the computing system of the merchant, an authorization request for a payment transaction initiated by the point of sales terminal in the payment account using the account information, wherein the transaction handler is coupled to the data warehouse;

in response to the authorization request, determine, by the rule engine coupled with the transaction handler and the data warehouse, a set of privacy preferences based on the privacy policy of the user stored in the data warehouse;

in response to the determination of the set of privacy preferences, insert, by the transaction handler, a privacy indicator in an authorization response, wherein the privacy indicator includes the set of privacy preferences, and transmit, by the transaction handler over the payment processing network, the authorization response for the payment transaction to the point of sales terminal; and in response to receiving the privacy indicator including the set of privacy preferences in the authorization response, remove, by the computing system of the merchant, user data relevant to the payment transaction from the computing system of the merchant after a time period of the payment transaction based on the set of privacy preferences.

15. The at least one non-transitory computer-storage medium of claim 14, wherein the privacy indicator further comprises an address that specifies a location on the portal from which the computing system of the merchant can download the set of privacy preferences.

16. The at least one non-transitory computer-storage medium of claim 14, wherein the personal computing device comprises one of a mobile phone, a personal digital assistant, or a personal computer.

* * * * *